US012578076B2

(12) United States Patent
Wang et al.

(10) Patent No.: US 12,578,076 B2
(45) Date of Patent: Mar. 17, 2026

(54) DUAL-OUTPUT LASER-DRIVEN LIGHT SOURCE

(71) Applicants: HAMAMATSU PHOTONICS K.K., Hamamatsu (JP); ENERGETIQ TECHNOLOGY, INC., Wilmington, MA (US)

(72) Inventors: Qingsong Wang, Lexington, MA (US); Huiling Zhu, Lexington, MA (US)

(73) Assignees: HAMAMATSU PHOTONICS K.K., Shizuoka (JP); ENERGETIQ TECHNOLOGY, INC., Wilmington, MA (US)

( * ) Notice: Subject to any disclaimer, the term of this patent is extended or adjusted under 35 U.S.C. 154(b) by 63 days.

(21) Appl. No.: 18/329,505

(22) Filed: Jun. 5, 2023

(65) Prior Publication Data

US 2024/0401775 A1 Dec. 5, 2024

(51) Int. Cl.
*F21V 7/04* (2006.01)
*F21K 9/61* (2016.01)
*F21V 9/20* (2018.01)

(52) U.S. Cl.
CPC ................ *F21V 7/041* (2013.01); *F21K 9/61* (2016.08); *F21V 9/20* (2018.02)

(58) Field of Classification Search
CPC ...... F21V 7/0025; F21V 7/005; F21V 7/0058; F21V 7/0066; F21V 7/04–09; F21V 9/20
See application file for complete search history.

(56) References Cited

U.S. PATENT DOCUMENTS

| | | | |
|---|---|---|---|
| 3,054,921 | A | 9/1962 | Lye |
| 3,227,923 | A | 1/1966 | Marrison |
| 3,418,507 | A | 12/1968 | Young |
| 3,427,564 | A | 2/1969 | Okaya |

(Continued)

FOREIGN PATENT DOCUMENTS

| | | | |
|---|---|---|---|
| CN | 1509419 | A | 6/2004 |
| CN | 105283924 | A | 1/2016 |

(Continued)

OTHER PUBLICATIONS

US 8,471,227 B2, 06/2013, Kakizaki (withdrawn)

(Continued)

*Primary Examiner* — Sean P Gramling
(74) *Attorney, Agent, or Firm* — Rauschenbach Patent Law Group, PLLC; Kurt Rauschenbach

(57) ABSTRACT

A dual-output light source includes a laser-driven light source that generates light from a thermal plasma over an angular range of emission of at least 180 degrees. A first and second off-axis conical mirror are positioned within the at least 180 degrees of emission of the thermal plasma so that light generated by the plasma propagating from a first region of emission strikes a first focal point of the first off-axis conical mirror and light generated by the plasma propagating from a second region of emission strikes a first focal point of the second off-axis conical mirror. The first and second off-axis conical mirrors reflect light in a respective and first and second optical paths. A first optical filter having a first bandwidth is positioned in the first optical path. A second optical filter having a second bandwidth is positioned in the second optical path.

44 Claims, 6 Drawing Sheets

(56) References Cited

U.S. PATENT DOCUMENTS 3,454,921 A 7/1969 Coleman et al.
3,495,118 A 2/1970 Richter
3,502,929 A 3/1970 Richter
3,582,822 A 6/1971 Kamey
3,619,588 A 11/1971 Chambers
3,636,395 A 1/1972 Banes, Jr.
3,641,389 A 2/1972 Leidigh
3,657,588 A 4/1972 McRae
3,731,133 A 5/1973 McRae
3,764,466 A 10/1973 Dawson
3,806,496 A 4/1974 Shorr et al.
3,808,496 A 4/1974 McRae
3,826,996 A 7/1974 Jaegle et al.
3,900,803 A 8/1975 Silfvast et al.
3,911,318 A 10/1975 Spero
3,949,258 A 4/1976 Soodak
3,982,201 A 9/1976 Rosenkrantz et al.
4,054,812 A 10/1977 Lessner
4,063,803 A 12/1977 Wright
4,088,966 A 5/1978 Samis
4,152,625 A 5/1979 Conrad
4,177,435 A 12/1979 Brown
4,179,037 A 12/1979 Chan
4,179,566 A 12/1979 Nadelson
4,263,095 A 4/1981 Thode
4,272,681 A 6/1981 Fill
4,485,333 A 11/1984 Goldbert
4,498,029 A 2/1985 Yoshizawa et al.
4,536,640 A 8/1985 Vukanovic
4,599,540 A 7/1986 Roberts
4,633,128 A 12/1986 Roberts
4,646,215 A 2/1987 Levin et al.
4,702,716 A 10/1987 Roberts
4,724,352 A 2/1988 Schuda
RE32,626 E 3/1988 Yoshizawa et al.
4,730,895 A 3/1988 Siedband et al.
4,780,608 A 10/1988 Cross et al.
4,785,216 A 11/1988 Roberts
4,789,788 A 12/1988 Cox
4,866,517 A 9/1989 Mohizuki
4,868,458 A 9/1989 Davenport et al.
4,872,189 A 10/1989 Frankel
4,889,605 A 12/1989 Asmus
4,901,330 A 2/1990 Wolfram et al.
4,978,893 A 12/1990 Brannon
4,979,893 A 12/1990 Pappalardo et al.
5,052,780 A 10/1991 Klein
5,153,673 A 10/1992 Amirav
5,299,279 A 3/1994 Roberts
5,317,618 A 5/1994 Nakahara
5,334,913 A 8/1994 Ury et al.
5,359,621 A 10/1994 Tsunoda
5,418,420 A 5/1995 Roberts
5,442,184 A 8/1995 Palmer et al.
5,506,857 A 4/1996 Meinzer
5,508,034 A 4/1996 Bernstein
5,508,934 A 4/1996 Moslehi
5,516,857 A 5/1996 Mann
5,561,338 A 10/1996 Roberts
5,672,931 A 9/1997 Kiss
5,686,996 A 11/1997 Fidler et al.
5,789,863 A 8/1998 Takahashi
5,790,575 A 8/1998 Zamel et al.
5,801,495 A 9/1998 Smolka et al.
5,903,088 A 5/1999 Sugitani
5,905,268 A 5/1999 Garcia
5,905,572 A 5/1999 Li
5,921,311 A 7/1999 Menendez et al.
5,923,116 A 7/1999 Mercer
5,940,182 A 8/1999 Lepper
6,005,332 A 12/1999 Mercer
6,025,916 A 2/2000 Quick
6,061,379 A 5/2000 Schoen
6,074,516 A 6/2000 Howald
6,106,091 A 8/2000 Osawa et al.
6,108,091 A 8/2000 Pecen
6,129,807 A 10/2000 Grimbergen
6,181,053 B1 1/2001 Roberts
6,184,517 B1 2/2001 Sawada et al.
6,200,005 B1 3/2001 Roberts
6,212,989 B1 4/2001 Beyer
6,235,147 B1 5/2001 Lee et al.
6,236,147 B1 5/2001 Manning
6,265,813 B1 7/2001 Knox
6,274,970 B1 8/2001 Capobianco
6,275,565 B1 8/2001 Tomie
6,281,629 B1 8/2001 Tanaka
6,285,131 B1 9/2001 Kiss
6,288,780 B1 9/2001 Fairley et al.
6,316,867 B1 11/2001 Roberts
6,331,993 B1 12/2001 Brown
6,339,279 B1 1/2002 Miyamoto
6,339,280 B1 1/2002 Miyamoto
6,351,058 B1 2/2002 Roberts
6,374,012 B1 4/2002 Bergmann et al.
6,400,067 B1 6/2002 Manning
6,400,089 B1 6/2002 Salvermoser
6,414,436 B1 7/2002 Eastlund
6,417,625 B1 7/2002 Brooks et al.
6,445,134 B1 9/2002 Asmus
6,493,364 B1 12/2002 Baumler et al.
6,504,319 B2 1/2003 Herter
6,504,903 B1 1/2003 Kondo
6,532,100 B1 3/2003 Partanen
6,541,924 B1 4/2003 Kane et al.
6,597,087 B2 7/2003 Roberts
6,602,104 B1 8/2003 Roberts
6,670,758 B2 12/2003 Beech
6,737,809 B2 5/2004 Espiau
6,762,849 B1 7/2004 Rulkens
6,768,264 B2 7/2004 Beech
6,788,404 B2 9/2004 Lange
6,795,182 B2 9/2004 Rakuljic et al.
6,816,323 B2 11/2004 Colin et al.
6,821,377 B2 11/2004 Saito
6,834,984 B2 12/2004 Tausch
6,865,255 B2 3/2005 Richardson
6,867,419 B2 3/2005 Tajima
6,914,919 B2 7/2005 Watson
6,956,329 B2 10/2005 Brooks et al.
6,956,885 B2 10/2005 Taylor
6,970,492 B2 11/2005 Govorkov
6,972,421 B2 12/2005 Melnychuk et al.
7,050,149 B2 5/2006 Owa et al.
7,072,367 B2 7/2006 Arisawa
7,087,914 B2 8/2006 Akins et al.
7,158,221 B2 1/2007 Davis
7,164,144 B2 1/2007 Partlo et al.
7,176,633 B1 2/2007 Roberts
7,274,435 B2 9/2007 Hiura
7,307,375 B2 12/2007 Smith et al.
7,368,741 B2 5/2008 Melnychuk
7,399,961 B2 7/2008 Chen et al.
7,399,981 B2 7/2008 Cheymol et al.
7,427,167 B2 9/2008 Holder et al.
7,429,818 B2 9/2008 Chang et al.
7,435,982 B2 10/2008 Smith
7,439,497 B2 10/2008 Dantus
7,439,530 B2 10/2008 Ershov
7,456,417 B2 11/2008 Murakami et al.
7,567,607 B2 7/2009 Knowles et al.
7,571,349 B2 8/2009 Levidow et al.
7,598,509 B2 10/2009 Ershov
7,632,419 B1 12/2009 Grimgergen
7,652,430 B1 1/2010 Delgado
7,671,349 B2 3/2010 Bykanov
7,679,027 B2 3/2010 Bogatu
7,679,276 B2 3/2010 Blondia
7,680,158 B2 3/2010 Endo
7,705,331 B1 4/2010 Kirk et al.
7,773,656 B1 8/2010 Mills
7,786,455 B2 8/2010 Smith
7,795,816 B2 9/2010 Jennings
8,003,963 B2 8/2011 Nagai et al.

(56) References Cited

U.S. PATENT DOCUMENTS

| | | | |
|---|---|---|---|
| 8,143,790 | B2 | 3/2012 | Smith |
| 8,148,900 | B1 | 4/2012 | Kirk et al. |
| 8,242,671 | B2 | 8/2012 | Blondia |
| 8,242,695 | B2 | 8/2012 | Sumitomo |
| 8,253,926 | B2 | 8/2012 | Sumitomo |
| 8,309,943 | B2 | 11/2012 | Smith |
| 8,320,424 | B2 | 11/2012 | Bolt |
| 8,427,067 | B2 | 4/2013 | Espiau |
| 8,525,138 | B2 | 9/2013 | Smith et al. |
| 8,710,475 | B2 | 4/2014 | Komori et al. |
| 8,969,841 | B2 | 3/2015 | Smith |
| 9,048,000 | B2 | 6/2015 | Smith |
| 9,185,786 | B2 | 11/2015 | Smith |
| 9,576,785 | B2 | 2/2017 | Blondia |
| 9,609,732 | B2 | 3/2017 | Smith |
| 9,678,262 | B2 | 6/2017 | Görtz et al. |
| 9,741,553 | B2 | 8/2017 | Blondia |
| 9,748,086 | B2 | 8/2017 | Blondia |
| 9,922,814 | B2 | 3/2018 | Blondia |
| 10,006,865 | B1 | 6/2018 | Shaughnessy et al. |
| 10,008,378 | B2 | 6/2018 | Blondia |
| 10,057,973 | B2 | 8/2018 | Blondia |
| 10,078,167 | B2 | 9/2018 | Brune et al. |
| 10,109,473 | B1 | 10/2018 | Blondia et al. |
| 10,186,414 | B2 | 1/2019 | Blondia |
| 10,186,416 | B2 | 1/2019 | Blondia |
| 10,203,247 | B2 | 2/2019 | Brady et al. |
| 10,217,625 | B2 | 2/2019 | Bezel et al. |
| 10,222,701 | B2 | 3/2019 | Zhao et al. |
| 10,770,282 | B1 | 9/2020 | Abramenko et al. |
| 10,964,523 | B1 | 3/2021 | Gayasov et al. |
| 11,587,781 | B2 | 2/2023 | Partlow et al. |
| 11,784,037 | B2 | 10/2023 | Partlow et al. |
| 12,014,918 | B2 | 6/2024 | Partlow et al. |
| 12,085,387 | B1 | 9/2024 | Wang et al. |
| 12,144,072 | B2 | 11/2024 | Partlow et al. |
| 12,156,322 | B2 | 11/2024 | Niell, III et al. |
| 12,165,856 | B2 | 12/2024 | Home et al. |
| 12,176,200 | B2 | 12/2024 | Partlow et al. |
| 2001/0035720 | A1 | 11/2001 | Guthrie |
| 2002/0021508 | A1 | 2/2002 | Ishihara |
| 2002/0036820 | A1 | 3/2002 | Merriam |
| 2002/0044624 | A1 | 4/2002 | Davis et al. |
| 2002/0044629 | A1 | 4/2002 | Hertz et al. |
| 2002/0080834 | A1 | 6/2002 | Kusunose |
| 2002/0172235 | A1 | 11/2002 | Chang et al. |
| 2003/0006381 | A1 | 1/2003 | Yoo |
| 2003/0006383 | A1 | 1/2003 | Melnychuk |
| 2003/0034736 | A1 | 2/2003 | Eastlund |
| 2003/0052609 | A1 | 3/2003 | Eastlund et al. |
| 2003/0066139 | A1 | 4/2003 | Go et al. |
| 2003/0068012 | A1 | 4/2003 | Ahmad et al. |
| 2003/0086139 | A1 | 5/2003 | Wing So |
| 2003/0090902 | A1 | 5/2003 | Kavanaugh |
| 2003/0147499 | A1 | 8/2003 | Kondo |
| 2003/0168982 | A1 | 9/2003 | Kim |
| 2003/0193281 | A1 | 10/2003 | Manning |
| 2003/0231496 | A1 | 12/2003 | Sato et al. |
| 2004/0008433 | A1 | 1/2004 | Margeson |
| 2004/0016894 | A1 | 1/2004 | Wester |
| 2004/0018647 | A1 | 1/2004 | Jones |
| 2004/0026512 | A1 | 2/2004 | Otsubo |
| 2004/0071267 | A1 | 4/2004 | Jacob et al. |
| 2004/0084406 | A1 | 5/2004 | Kamp |
| 2004/0108473 | A1 | 6/2004 | Melnychuk |
| 2004/0129896 | A1 | 7/2004 | Schmidt et al. |
| 2004/0134426 | A1 | 7/2004 | Tomoyasu |
| 2004/0183031 | A1 | 9/2004 | Silverman |
| 2004/0183038 | A1 | 9/2004 | Hiramoto et al. |
| 2004/0218172 | A1 | 11/2004 | DeVerse et al. |
| 2004/0238762 | A1 | 12/2004 | Mizoguchi et al. |
| 2004/0239894 | A1 | 12/2004 | Shimada |
| 2004/0245350 | A1 | 12/2004 | Zeng |
| 2004/0264512 | A1 | 12/2004 | Hartlove et al. |
| 2005/0057158 | A1 | 3/2005 | Chang et al. |
| 2005/0167618 | A1 | 8/2005 | Hoshino et al. |
| 2005/0168148 | A1 | 8/2005 | Allen |
| 2005/0199829 | A1 | 9/2005 | Partlo et al. |
| 2005/0205803 | A1 | 9/2005 | Mizoguchi |
| 2005/0205811 | A1 | 9/2005 | Partlo et al. |
| 2005/0207454 | A1 | 9/2005 | Starodoumov |
| 2005/0225739 | A1 | 10/2005 | Hiura |
| 2005/0230645 | A1 | 10/2005 | Melnychuk et al. |
| 2005/0243390 | A1 | 11/2005 | Tejnil |
| 2005/0270528 | A1 | 12/2005 | Geshwind et al. |
| 2005/0276285 | A1 | 12/2005 | Huang et al. |
| 2006/0017387 | A1 | 1/2006 | Smith |
| 2006/0039435 | A1 | 2/2006 | Cheymol et al. |
| 2006/0078017 | A1 | 4/2006 | Endo et al. |
| 2006/0103952 | A1 | 5/2006 | Gouch |
| 2006/0131515 | A1 | 6/2006 | Partlo et al. |
| 2006/0152128 | A1 | 7/2006 | Manning |
| 2006/0176925 | A1 | 8/2006 | Nakano |
| 2006/0186356 | A1 | 8/2006 | Iami et al. |
| 2006/0192152 | A1 | 8/2006 | Ershov et al. |
| 2006/0202625 | A1 | 9/2006 | Song |
| 2006/0215712 | A1 | 9/2006 | Ziener |
| 2006/0219957 | A1 | 10/2006 | Ershov et al. |
| 2006/0228072 | A1 | 10/2006 | Davis et al. |
| 2006/0255298 | A1 | 11/2006 | Bykanov |
| 2007/0001131 | A1 | 1/2007 | Ershov |
| 2007/0210717 | A1 | 9/2007 | Smith |
| 2007/0228288 | A1 | 10/2007 | Smith |
| 2007/0228300 | A1 | 10/2007 | Smith |
| 2007/0285921 | A1 | 12/2007 | Zulim et al. |
| 2008/0048133 | A1 | 2/2008 | Bykanov |
| 2008/0055712 | A1 | 3/2008 | Noelscher |
| 2008/0059096 | A1 | 3/2008 | Stenstrom |
| 2008/0099699 | A1 | 5/2008 | Yabuta |
| 2008/0260335 | A1 | 10/2008 | Laitala et al. |
| 2008/0272317 | A1 | 11/2008 | Shumlak et al. |
| 2009/0032740 | A1 | 2/2009 | Smith et al. |
| 2009/0091273 | A1 | 4/2009 | Horioka |
| 2009/0196801 | A1 | 8/2009 | Mills |
| 2009/0267003 | A1 | 10/2009 | Moriya |
| 2009/0314967 | A1 | 12/2009 | Moriya |
| 2010/0007894 | A1 | 1/2010 | Suehira |
| 2010/0164380 | A1 | 7/2010 | Sumitomo |
| 2010/0172014 | A1 | 7/2010 | Kanade et al. |
| 2010/0181503 | A1 | 7/2010 | Yanagida |
| 2010/0253935 | A1 | 10/2010 | Mackinnon et al. |
| 2010/0264820 | A1 | 10/2010 | Sumitomo |
| 2010/0280321 | A1 | 11/2010 | Modell |
| 2011/0084717 | A1 | 4/2011 | Fong et al. |
| 2011/0150590 | A1 | 6/2011 | Buchner |
| 2011/0181191 | A1 | 7/2011 | Smith et al. |
| 2011/0204265 | A1 | 8/2011 | Smith et al. |
| 2011/0285996 | A1 | 11/2011 | Wang |
| 2011/0291566 | A1 | 12/2011 | Bezel |
| 2013/0234597 | A1 | 9/2013 | Kusunose et al. |
| 2013/0342105 | A1 | 12/2013 | Shchemelinin et al. |
| 2014/0071406 | A1 | 3/2014 | Manni et al. |
| 2014/0117258 | A1 | 5/2014 | Smith |
| 2014/0197733 | A1 | 7/2014 | Delgado |
| 2014/0233016 | A1 | 8/2014 | Aiyer |
| 2014/0268127 | A1 | 9/2014 | Day |
| 2015/0021500 | A1 | 1/2015 | Smith |
| 2015/0034838 | A1 | 2/2015 | Bezel et al. |
| 2015/0131137 | A1 | 5/2015 | Burry et al. |
| 2015/0289353 | A1 | 10/2015 | Smith |
| 2016/0057845 | A1 | 2/2016 | Smith |
| 2016/0057854 | A1 | 2/2016 | Schneider et al. |
| 2016/0093463 | A1 | 3/2016 | Bhattacharjee et al. |
| 2017/0052118 | A1 | 2/2017 | Loock et al. |
| 2017/0135192 | A1 | 5/2017 | Blondia |
| 2017/0150590 | A1 | 5/2017 | Chimmalgi et al. |
| 2017/0213704 | A1 | 7/2017 | Chen |
| 2019/0021158 | A1 | 1/2019 | Nozaki |
| 2019/0037676 | A1 | 1/2019 | Khodykin et al. |
| 2019/0045615 | A1 | 2/2019 | Mori et al. |
| 2019/0053364 | A1 | 2/2019 | Mori et al. |
| 2019/0075641 | A1 | 3/2019 | Kuritsyn et al. |
| 2019/0302570 | A1 | 10/2019 | Kumar et al. |
| 2020/0012165 | A1 | 1/2020 | Haller |

(56) References Cited

U.S. PATENT DOCUMENTS

| | | | |
|---|---|---|---|
| 2020/0051785 A1 | 2/2020 | Miller et al. | |
| 2020/0371344 A1 | 11/2020 | Eng et al. | |
| 2020/0393687 A1 | 12/2020 | Yabu et al. | |
| 2021/0112647 A1 | 4/2021 | Coleman | |
| 2021/0120659 A1 | 4/2021 | Szilagyi et al. | |
| 2021/0282256 A1 | 9/2021 | Abramenko et al. | |
| 2022/0229307 A1* | 7/2022 | Wang ................. | G02B 26/0833 |
| 2022/0375740 A1 | 11/2022 | Partlow et al. | |
| 2023/0178357 A1 | 6/2023 | Partlow et al. | |
| 2023/0268167 A1 | 8/2023 | Horne et al. | |
| 2023/0319959 A1 | 10/2023 | Partlow et al. | |
| 2023/0363639 A1 | 11/2023 | Preciado | |
| 2023/0420242 A1 | 12/2023 | Partlow et al. | |
| 2024/0194454 A1 | 6/2024 | Smith et al. | |
| 2024/0196506 A1 | 6/2024 | Niell, III et al. | |
| 2024/0297035 A1 | 9/2024 | Partlow et al. | |
| 2025/0040004 A1 | 1/2025 | Partlow et al. | |
| 2025/0056705 A1 | 2/2025 | Niel, III et al. | |
| 2025/0069870 A1 | 2/2025 | Horne et al. | |
| 2025/0081319 A1 | 3/2025 | Niell, III et al. | |
| 2025/0102290 A1 | 3/2025 | Wang et al. | |

FOREIGN PATENT DOCUMENTS

| | | | |
|---|---|---|---|
| CN | 210533985 | U | 5/2020 |
| DE | 19910725 | A1 | 10/1999 |
| DE | 102011113681 | A1 | 3/2013 |
| DE | 10-2019-107924 | A1 | 10/2020 |
| EP | 0151188 | A | 11/1991 |
| EP | 1083777 | A9 | 3/2001 |
| EP | 1397030 | A1 | 3/2004 |
| EP | 1313128 | B1 | 5/2011 |
| EP | 2469250 | A2 | 6/2012 |
| EP | 2534672 | B1 | 6/2016 |
| FR | 1471215 | A | 3/1967 |
| FR | 2554302 | A1 | 5/1985 |
| GB | 2266406 | A | 10/1993 |
| JP | 53-103395 | A | 9/1978 |
| JP | 61-193358 | A | 8/1986 |
| JP | 1-296560 | A | 11/1989 |
| JP | 4-144053 | A | 5/1992 |
| JP | 05-061397 | A | 3/1993 |
| JP | 5-82087 | A | 4/1993 |
| JP | H05-82087 | B2 | 11/1993 |
| JP | 8-299951 | A | 11/1996 |
| JP | 9-288995 | A | 11/1997 |
| JP | 2003-218025 | A | 7/2003 |
| JP | 2003-317675 | A | 11/2003 |
| JP | 2004-134166 | A | 4/2004 |
| JP | 2006-010675 | A | 1/2006 |
| JP | 2006-080255 | A | 3/2006 |
| JP | 2006-194925 | A | 7/2006 |
| JP | 2007-506947 | A | 3/2007 |
| JP | 4255662 | B2 | 4/2009 |
| JP | 2009-140762 | A | 6/2009 |
| JP | 2010-087388 | A | 4/2010 |
| JP | 2010-171159 | A | 8/2010 |
| JP | 2011-023712 | A | 2/2011 |
| JP | 2011-035039 | A | 2/2011 |
| JP | 2011-048285 | A | 3/2011 |
| JP | 2012-018415 | A | 1/2012 |
| JP | 2013-041954 | A | 2/2013 |
| JP | 2015-519605 | A | 7/2015 |
| JP | 2015-166757 | A | 9/2015 |
| JP | 2016-138989 | A | 8/2016 |
| JP | 6243845 | B2 | 12/2017 |
| JP | 2019-021432 | A | 2/2019 |
| JP | 2022-017024 | A | 1/2022 |
| KR | 10-2001-0062437 | A | 7/2001 |
| KR | 10-2005-0003392 | A | 1/2005 |
| KR | 10-2006-0064319 | A | 6/2006 |
| KR | 10-2006-0087004 | A | 8/2006 |
| KR | 10-2008-0108111 | A | 12/2008 |
| KR | 10-2010-0114455 | A | 10/2010 |
| KR | 10-1269115 | B1 | 5/2013 |
| KR | 10-2016-0071231 | A | 6/2016 |
| KR | 10-1639963 | B1 | 7/2016 |
| KR | 10-2020-0017137 | A | 2/2020 |
| NL | 8403294 | A | 6/1985 |
| RU | 2266628 | C2 | 12/2005 |
| RU | 2278483 | C2 | 6/2006 |
| RU | 2326463 | C2 | 6/2008 |
| RU | 2780202 | C1 | 9/2022 |
| TW | 201713788 | A | 4/2017 |
| TW | 201801132 | A | 1/2018 |
| TW | 202226738 | A | 7/2022 |
| WO | 94/10729 | A1 | 5/1994 |
| WO | 98/11388 | A1 | 3/1998 |
| WO | 98/54611 | A2 | 12/1998 |
| WO | 99/18594 | A1 | 4/1999 |
| WO | 02/087291 | A2 | 10/2002 |
| WO | 03/079391 | A2 | 9/2003 |
| WO | 2004/023061 | A2 | 3/2004 |
| WO | 2004/084592 | A2 | 9/2004 |
| WO | 2004/097520 | A2 | 11/2004 |
| WO | 2005/004555 | A2 | 1/2005 |
| WO | 2006/017119 | A2 | 2/2006 |
| WO | 2007/002170 | A2 | 1/2007 |
| WO | 2010/093903 | A2 | 8/2010 |
| WO | 2018/136683 | A1 | 7/2018 |
| WO | 2019/023150 | A1 | 1/2019 |
| WO | 2019/023303 | A1 | 1/2019 |
| WO | 2022/159352 | A1 | 7/2022 |
| WO | 2022/251000 | A1 | 12/2022 |
| WO | 2023/158909 | A1 | 8/2023 |
| WO | 2023/192696 | A1 | 10/2023 |
| WO | 2024/123564 | A1 | 6/2024 |
| WO | 2024/123565 | A1 | 6/2024 |
| WO | 2024/253718 | A1 | 12/2024 |
| WO | 2025/049100 | A1 | 3/2025 |

OTHER PUBLICATIONS

Ballard et al., "High-Power, Laser-Produced-Plasma EUV Source", Proc. SPIE, vol. 4688, 2002, pp. 302-309.

Chen et al., "High-temperature Operation of Periodic Index Separate Confinement Heterostructure Quantum Well Laser", Apll. Phys. Lett., vol. 59, No. 22, 1991, pp. 2784-2786.

Coffey, "Fiber Lasers Achieve World-Record Powers", 2003, pp. 13-14.

Coherent, "Conduction-Cooled Bar Packages (CCPs), 965-985 nm", 2015, pp. 1-4.

Cohn et al., "Magnetic-Field-Dependent Breakdown of CO2-Laser-Produced Plasma", Appl. Phys. Lett., vol. 20, No. 6, 1972, pp. 225-227.

Cooley et al., "Fundamentals of Discharge Initiation in Gas-Fed Pulsed Plasma Thrusters", The 29th International Electric Propulsion Conference, Princeton University, 2005, pp. 1-11.

Cooper, "Spectroscopic Identification of Water-Oxygen and Water-Hydroxyl Complexes and their Importance to Icy Duter Solar System Bodies", Chemistry School of Biomedical and Chemical Sciences, 2004, pp. 1-116.

Cremers et al., "Evaluation of the Continuous Optical No. 4, 1985, pp. 665-679. Discharge for Spectrochemical Analysis," Spectrochimica Acta, vol. 40B, No. 4, 1985, pp. 665-679.

Cross et al., "High Kinetic Energy (1-10eV) Laser Sustained Neutral Atom Beam Source", Nuclear Instruments and Methods in Physics Research B13, 198, pp. 658-662.

Cu-Nguyen et al., "Tunable Confocal Hyperspectral Imaging System", Optical MEMS and Nanophotonics, 2013, pp. 9-10.

Cu-Nguyen et al., "Tunable Hyperchromatic Lens System for Confocal Hyperspectral Sensing", Optics Express, vol. 21, No. 13, 2013, pp. 27611-27621.

Daily et al., "Two-Photon Photoionization of the Ca 4s3d(1)D(2) Level in an Optical Dipole Trap", Physical Review A, vol. 71, 2005, p. 043406-1-343406-5.

Davis, "Lasers And Electra-Optics: Fundamentals And Engineering", 1996, pp. 1-35.

De Jong et al., "A Pulsed Arc-Glow Hollow Cathode Lamp", Spectroehimlea Acta, vol. 29B, 1974, pp. 179-190.

(56) References Cited

OTHER PUBLICATIONS

Demtroder, "Laser Spectroscopy: Basic Concepts And Instrumentation", Second Enlarged Edition, 1982, pp. 395-398.
Derra et al., "UHP Lamp Systems for Projection Applications", J. Phys. D: Appl. Phys. vol. 38, 2005, pp. 2995-3010.
DET25K—GaP Detector, 150-550 nm, 1 ns Rise Time, 4.8 mm2, 8-32 Taps, Thorlabs, 2005, p. 1.
Digonnet, "Rare-Earth-Doped Fiber Lasers And Amplifiers", Optical Engineering, 2001, pp. 144-170.
Diwakar et al., "Role of Laser Pre-Pulse Wavelength and Inter-Pulse Delay on Signal Enhancement in Collinear Double-Pulse Laserlinduced Breakdown Spectroscopy", Spectrochimia Acta, Part B, 2013, pp. 65-73.
Dorsch et al., "Performance and Lifetime of High-Power Diode Lasers and Diode Laser Systems", Proc. SPIE, vol. 3628, 1999, pp. 56-63.
Dorsch et al., 2 kW cw Fiber-coupled Diode Laser System, Proceedings of SPIE vol. 3889, 2000, pp. 45-53.
Durfee III et al., "Development of a Plasma Waveguide for High-Intensity Laser Pulses", Physical Review E, vol. 51, No. 3, 1995, pp. 2368-2389.
Dusterer et al., "Optimization of EUVRradiation Yield from Laser-Produced Plasma", Appl. Phys., B-73, 2001, pp. 693-698.
Eckstrom et al., "Microwave Interactions With Plasmas", IEEE Trans. Plasma Sci. vol. 18, 1992, pp. 1-9 with appendixes.
Edmund Optics, Lens UV-SCX 25MM DIA x 25MM FL Uncoated (Drawing), p. 1.
Eletskii et al., "Formation kinetics and parameters of a photoresonant plasma", Soy. Phys. JETP, vol. 67, No. 5, 1988, pp. 920-924.
Emmett et al., "Direct Measurement of Xenon Flashtube Opacity", Journal of Applied Physics, vol. 35, No. 9, 1964, pp. 2601-2604.
Endo et al., "Laser Produced EUV Light Source Development for HVM", SPIE Advanced Lithography, 2007, pp. 1-25.
Erskine et al., "Measuring Opacity of Shock Generated Argon Plasmas" , J. Quart Spectro. Radial Transfer, vol. 51, No. 12, 1994, pp. 97-100.
F10T/F10T2 and F6 Lightshield Systems Parts Listing, Heraeus Noblelight America LLC, 2015, pp. 1-12.
F300S/F300SQ UV Lamp System Parts Listing, Heraeus Noblelight America LLC, 2015, pp. 1-26.
Feng et al., "A stigmatic Ultraviolet-Visible Monochromator for Use with a High Brightness Laser Driven Plasma Light Source", Review of Scientific Instruments, vol. 84, 2013, pp. 1-6.
Fiedorowicz et al., "X-Ray Emission form Laser-Irradiated Gas Puff Targets," Appl. Phys. Lett., vol. 62, No. 22, May 31, 1993, pp. 2778-2780.
Fomenkov et al., "Laser Produced Plasma Light Source for EUVL",Cymer Inc., 17075 Thommint Court, San Diego, CA 92127, USA, 2011, pp. 1-6.
Franzen, "Continuous Laser-Sustained Plasmas", 1973, J. Appl. Phys., vol. 44, pp. 1727-1732.
Franzen, "CW Gas Breakdown in Argon Using 10.6-μm Laser Radiation," Appl. Phys. Lett., vol. 21, No. 2, Jul. 15, 1972, pp. 62-64.
Frey et al., "Spectroscopy and kinetics of the ionic cesium flouride excimer excited by a Laser-Produced Plasma", Journal of the Optical Society of America B, vol. 6, No. 8, 1989, pp. 1529-1535.
Fujimoto et al., "High Power InGaAs/AlGaAs laser Diodes with Decoupled Confinement Heterostructure", SPIE vol. 3628, 1999, pp. 38-45.
Galvanauskas, "Fiber laser based EUV lithography sources", Panel discussion presentation at the SEMATECH EUV Source Workshop (2007).
Geisler et al., "Spectrometer System Using a Modular Echelle Spectrograph and a Laser-Driven Continuum Source for Simultaneous Multi-Element Determination by Graphite Furnace Absorption Spectrometry", Spectrochimica Acta Part B, vol. 107, 2015, pp. 11-16.
Generalov et al., "Experimental Investigation of a Continuous 1972, pp. 763-769. Optical Discharge," Soviet Physics JETP, vol. 34, No. 4, Apr. 1972, pp. 763-769.
Gentile et al., "Oxidative Decontamination of Tritiated Materials Employing Ozone Gas", PPPL, 2002, pp. 1-9.
Gentile et al., "Tritium Decontamination of TFTR D-T Graphite Tiles Employing Ultra Violet Light and a Nd:YAG Laser", Japan Atomic Energy Research Institute, 1999, p. 321-322.
George et al., "13.5 nm EUV Generation from Tin-doped Droplets Using a Fiber Laser", Optics Express, vol. 15, No. 25, 2007, pp. 16348-356.
Girard et al., "Generating Conditions of a Laser-Sustained Argon Plasma Jet",J. Phys. D: Appl. Phys., vol. 26, 1993, pp. 1382-1393.
Glangetas, "New Design for a Microwave Discharge Lamp", Rev. Sci. Instrum., vol. 51, No. 3, 1980, pp. 390-391.
Griem, "Plasma Spectroscopy", 1964, pp. 172-176.
Gullikson et al., "A Soft X-Ray/EUV Reflectometer Based on a Laser Produced Plasma Source", Journal: Journal of X-Ray Science and Technology, vol. 3, No. 4, 1992, pp. 283-299.
Gwyn, "EVU Lithography Update: The timeline puts the screws to extreme ultraviolet lithography, but engineers rise to the challenge", SPIE, 2002, pp. 1-4.
Hadal et al., "Influence of Ambient Gas on the Temperature and Density of Laser Produced Carbon Plasma", Appl. Phys. Lett. vol. 72, No. 2, 1998, pp. 167-169.
International Search Report and Written Opinion received for corresponding PCT Application No. PCT/US2024/014239 mailed on May 28, 2024, 12 pages.
Mobarhan, "Test and Characterization of Laser Diodes: Determination of Principal Parameters", 1999, pp. 1-7.
Moody, "Maintenance of a Gas Breakdown in Argon Using 10.6-μ cw Radiation", Journal of Applied Physics, vol. 46, No. 6, Jun. 1975, pp. 2475-2482.
Mora, "Theoretical Model of Absorption of Laser Light by a Plasma", Phys. Fluids, vol. 25, No. 6, 1982, pp. 1051-1056.
Mordovanakis et al., "Demonstration of Fiber-laser-produced Plasma Source and Application to Efficient Extreme UV Light Generation", Optics Letter, vol. 31, No. 17, 2006, pp. 2517-2519.
Mosier-Boss et al., "Detection of Lead Derived from Automotive Scrap Residue Using a Direct Push Fiber-Optic Laser-Induced Breakdown Spectroscopy Metal Sensor", Applied Spectroscopy, vol. 59, No. 12, 2005, pp. 1445-1456.
Mosier-Boss et al., "Field Demonstrations of a Direct Push FO-LIBS Metal Sensor", Environ. Sci. Technol., vol. 36, 2002, pp. 3968-3976.
Motomura et al., "Temporal VUV Emission Characteristics Related to Generations and Losses of Metastable Atoms in Xenon Pulsed Barrier Discharge", J. Light & Vis. Env. vol. 30, No. 2, 2006, pp. 81-86.
Moulton, "Tunable Solid-State Lasers", Proceedings of the IEEE, vol. 80, No. 3, 1992, pp. 348-364.
Muller et al., "Theoretical Model for a Continuous Optical Discharge", Physica, 112C, 1982, pp. 259-270.
Nagano et al., "Present Status of Laser-Produced Plasma EUV Light Source", Proc. Of SPIE, vol. 7636, 2010, pp. 76363C-1-76363C-9.
Nakar et al., "Radiometric Characterization of Ultrahigh Radiance Xenon Short-Arc Discharge Lamps, Ben-Gurion University", Applied Optice, vol. 47,No. 2, Jan. 9, 2008.
Neukum, "Vom Halbleiterchip zum Laserwerkzeug", 2007, pp. 18-20.
Nikitin et al., "Guiding of Intense Femtosecond Pulses in Preformed Plasma Channels", Optics Letter, vol. 22, No. 23, 1997, pp. 1787-1789.
Norimatsu et al., "Cryostat to Provide a Solid Deuterium Layer in a Plastic Shell for the Gekko XII Glass Laser System", Review Of Scientific Instruments, vol. 63, No. 6, 1992, pp. 3378-3383.
Zajac et al., "10 W cw Nd-Doped Double-clad Fiber Laser Operating at 1.06 μm", Proceedings of SPIE vol. 5036, 2003, pp. 135-138.
OEM Compact Fiber Laser module 1090nm 10-20W CW/M With GTWave Technology, SPI Lasers LLC.
Oettinger et al., Plasma Ionization Enhancement by Laser Line Radiation, AIAA Journal, vol. 8, No. 5, 1970, pp. 880-885.

(56) References Cited

OTHER PUBLICATIONS

Yusim et al., "100 Watt, single-mode, CW, Linearly Polarized All-fiber Format 1.56um Laser with Suppression of Parasitic Lasing Effects",Proceedings of SPIE, vol. 5709, 2005, pp. 69-77.
Yoshizawa et al., "Disk-shaped Vacuum Ultraviolet Light Source Driven by Microwave Discharge for Photoexcited Processes", Appl. Physc. Lett., vol. 559, 1991, pp. 1678-1680.
Yoshino et al., "Absorption Spectrum of Xenon in the Vacuum-Ultraviolet Region",J. Opt. Soc. Am. B/vol. 2, No. 8, 1985, pp. 1268-1274.
Yamanaka, "Inertial Confinement Fusion Research at ILE Osaka", Nuclear Fusion, vol. 25, No. 9, 1985, pp. 1343-1349.
Yamakoshi et al., "Extreme-Ultraviolet Laser Photo-Pumped by a Self-Healing Hg Target",SPIE, Vo.. 2015, 1994, pp. 227-231.
Orth et al., "High-Resolution Spectra of Laser Plasma Light Sources in the Normal Incidence XUV Region", Applied Optics, vol. 25, No. 13, 1986, pp. 2215-2217.
OSRAM Opto Semiconductors Announces New Solutions for Laser Applications; New Offerings Provide High Output and Enhanced Reliability, Business Wire, Jun. 28, 2005, pp. 1-3.
Oxford Dictionary of Astronomy, definition of bound-bound transition, 2003, p. 59.
Pankert et al., "EUV Sources for the Alpha-Tools", Proc. Of SPIE, vol. 6151, 2006, pp. 1-9.
Pappas et al., "Formation of a Cesium Plasma by Continuous-Wave Resonance Excitation", Applied Spectroscopy, vol. 54, No. 8, 2000, pp. 1245-1249.
Parker, "McGraw-Hill Dictionary of Scientific and Technical Terms",5th Edition, 1994, p. 561.
Patel et al., "The Suitability of Sapphire for Laser Windows", Meas. Sci. Technol., vol. 10, 1999, pp. 146-151.
Pebler et al., "Stabilizing the Radiant Flux of a Xenon Arc Lamp", Applied Optice, vol. 20, No. 23, 1981, pp. 4059-4061.
Perry, "Solar Thermal Propulsion: An Investigation Of Solar Radiation Absorption In A Working Fluid", 1984 pp. 1-70.
Petring et al., "High Power Diode Lasers", Technology and Applications, 2007, pp. 285-533.
Phillip, "Optical Properties of Non-Crystalline Si, SiO, SiOx and SiO2", J. Phys. Chem. Solids, vol. 32, 1971, pp. 1935-1945.
Phillip, "Optical Transitions in Crystalline and Fused Quartz", Solid State Communications vol. 4, 1966, pp. 73-75.
Phillips et al.,"Characterization and Stabilization of Fiber-Coupled Laser Diode Arrays", Review Of Scientific Instruments, vol. 70, No. 7, 1999, pp. 2905-2909.
Plyler et al., "Precise Measurement of Wavelengths in Infrared Spectra", Journal of Research of the National Bureau of Standards, vol. 55, No. 5, 1955, pp. 279-284.
Polijanczuk et al., "Semiconductor Lasers for Microsoldering", 1991, pp. 6/1-6/4.
Prabhu et al., "High-Power CW Raman Fiber Laser Using Phosphosilicate Fiber Pumped by Yb-doped Double-clad Fiber Laser", IEE Colloquium on Advances in Interconnection Technology, 2001, pp. 482-485.
Raizer, "Continuous Optical Discharge: Generation and Support of Dense Low-Temperature Plasma by Laser Irradiation", 1996, pp. 87-94.
Raizer, "Gas Discharge Physics", 1991, pp. 1-449.
Raizer, "Optical Discharges," Sov. Phys. Usp., vol. 23, No. 11, 1980, pp. 789-806.
Rhemet, "Xenon Lamps", IEE Proc.,vol. 127, Pt. A, No. 3, 1980, pp. 190-195.
Richardson et al., "High Conversion Efficiency Mass-Limited Sn-Based Laser Plasma Source for Extreme Ultraviolet Lithography", J. Vac. Sci. Technol. B., vol. 22, No. 2, 2004, pp. 785-790.
Rietdorf et al., "Special Optical Elements", J. (eds) Handbook Of Biological Confocal Microscopy, 2006, pp. 43-58.
Rockstroh et al., "Spectroscopic Studies of Plasma During CW Laser Materials Interaction", J. Appl. Phys., vol. 61, No. 3, 1987, pp. 917-922.
Roth et al., "Directly Diode-laser-pumped Ti:sapphire laser", Optics Letters, vol. 34, No. 21, 2009, pp. 3334-3336.
Sacchi, "Laser-Induced Electric Breakdown in Water", J. Opt. Soc. Am. B, vol. 28, No. 2, 1991, pp. 337-345.
Sakamoto et al., "120W CW Output Power from Monolithic AlGaAs (800nm) Laser Diode Array Mounted on Diamond Fleatsink", Electronic Letter, vol. 28, No. 2, 1992, pp. 197-199.
Saloman, "Energy Levels and Observed Spectral Lines of Xenon, Xe(I) through Xe(LIV)", J. Phys. Chem. Ref. Data, vol. 33, No. 3, 2004, pp. 765-921.
Saraswat et al., "Single Wafer Rapid Thermal Multiprocessing", Mat. Res. Soc. Symp. Proc. vol. 146, 1989, pp. 3-13.
Abe et al., "KrF Laser Driven Xenon Plasma Light Source of a Small Field Exposure Tool", Proc. Of SPIE, vol. 6151, 2006, pp. 61513T-1-61513T-5.
Agrawal et al., "Infrared And Visible Semiconductor Lasers", 1993, pp. xiii-616.
Agrawal et al., "Semiconductor Lasers", Second edition, 1993, p. 547.
Ahmed et al., "Laser Optogalvanic Spectroscopic Studies of Xenon", J. Phys. B: At. Mol. Opt. Phys. 31, 1998, pp. 4017-4028.
Aitoumeziane et al., "Theoretical and Numerical Study of the Interaction of a Nanosecond Laser Pulse with a Copper Target for Laser-Induced Breakdown Spectroscopy Applications", J. Opt. Soc. Am. B, vol. 31, No. 1, 2014, pp. 53-61.
Al-Muhanna et al., High-Power (>10 W) Continuous-Wave Operation from 100-um-Aperture 0.97-um-emitting Al-Free Diode Lasers, Applied Physics Letters, vol. 73, No. 9, Aug. 31, 1998, pp. 1182-1184.
Angel, "LIBS Using Dual-Laser Pulses", 2002, p. 14.
Apter, "High-power Diode Lasers Offer Efficient Answer, Product Guide", 2005, pp. 1-3.
Aragon et al., "Determination of Carbon Content in Molten Steel Using Laser-Induced Breakdown Spectroscopy", 1993, pp. 306-608.
Arieli, Excitation of Gas Laser by Optical Pumping, Chapter 6.1, Gas Laser, 2006, p. 2b.
Arp et al., "Argon Mini-Arc Meets its Match: Use of a Laser-Driven Plasma Source in Ultraviolet-Detector Calibrations",Applied Optics vol. 53, Issue 6 , 2014, pp. 1089-1093.
Arp et al., "Feasibility of Generating a Useful Laser-Induced Breakdown Spectroscopy Plasma on Rocks at High Pressure: reliminary Study for a Venus Mission", Spectrochimica Acta Part B 59, 2004, pp. 987-999.
Arzuov et al., Self-Maintenance of a Continuous Optical Discharge in Gases Near Solid Targets, Soy. J. Quant. Electron., vol. 5, No. 5, 1975, pp. 523-525.
Azuma et al., Debris from Tape-Target Irradiated with Pulsed YAG Laser, Applied Surface Science, 2002, pp. 224-228.
B 11 3mmaxoe, 011THLIECKHE PA3PFIRb1,110flREPK4BAEMbIE I4311YLIEHMEM J1A3EPOB Efill)KHEI-0 ilk-. I4- EIA11A3OHA Ommixo-xmknyeckasi Kmue-rma B ra3ouoii gmuamme, www. chemphys.edu.ru/pdf/2014-11-29-001.pdf.
B.B. Kostin, I4311YLIEH14EF1J1A3Mbl, HAIPETOC4 KOPOTKI4MI4 11A3EPHb1MI4 14M11YIIbCAM14 23(2) 014314KA EfflA3Mbl 118 (1997).
B.T. Apxpinkmu and A. K. Dona HEIII4HEOHAFI 011T14KA I4 11PEOBPA3OBAHHE CBETA B IA3AX 153(3) YalEXI4 IM3I44ECK14X HAYK 423 (1987).
Babucke et al., "On the Energy Balance in the Core of Electrode-Stabilized High-Pressure Mercury Discharges", J. Phys. D: Appl. Phys. vol. 24, 1991, pp. 1316-1321.
Bachmann, "Goals and status of the German national research initiative BRIOLAS (brilliant diode lasers)", Proc. of SPIE vol. 6456, 2007, 645608-1.
Bachmann, "Industrial Applications of High Power Diode Lasers in Materials Processing", Applied Surface Science, 208-209, 2003, pp. 125-136.
Baer, "Plasma Diagnostics With Semiconductor Lasers Using Fluorescence And Absorption Spectroscopy", Stanford University ProQuest Dissertations Publishing, 1993, pp. 1-194.
Ball, "Raman Spectroscopy", vol. 17, No. 2, 2002, pp. 50-52.

(56) References Cited

OTHER PUBLICATIONS

Ballman et al., "Synthetic Quartz with High Ultraviolet Transmission", Applied Optics, vol. 7, No. 7, 1968, pp. 1387-1390.
Barnes et al., "Argon Arc Lamps", Applied Optics, vol. 24, No. 13, 1985, pp. 1947-1949.
Barnes et al., "High Power Diode Laser Cladding", Journal of Materials Processing Technology, vol. 138, 2003, pp. 411-416.
Bartz et al., "Optical Reflectivity Measurements Using a Laser Plasma Light Source", Appl. Phys. Lett. vol. 55, No. 19, 1989, pp. 1955-1957.
Bataller et al., "Nanosecond High-Power Dense Microplasma Switch for Visible Light", Applied Physics Letters, vol. 105, 2014, pp. 1-5.
Bauder, Radiation from High-Pressure Plasmas, Journal of Applied Physics, vol. 39, No. 1, 1968, pp. 148-152.
Beam Samplers; UV Fused Silica Beam Samplers, (AR Coating: 250-420 nm) (AR Coating: 350-700 nm) (AR Coating: 550-1050 nm) (AR Coating: 1050-1700 nm), 3 pages.
Beck, "Simple Pulse Generator for Pulsing Xenon Arcs with High Repetition Rate," Rev. Sci. Instrum., vol. 45, No. 2, Feb. 1974, pp. 318-319.
Belasri et al., "Electrical Approach of Homogenous High Pressure NelXe/CHI Dielectric Barrier Discharge for XeCl (308 nm) Lamp", Plasma Chem Plasma Process, vol. 31, 2011, pp. 787-798.
Bloch et al., "Field Test of a Novel Microlaser-Based Probe for in Situ Fluorescence Sensing of Soil Contamination", Applied Spectroscopy, vol. 52, No. 10, 1998, pp. 1299-1304.
Bogaerts et al., "Gas Discharge Plasmas and their Applications", Spectrochimica Acta Part B 57, 2001, pp. 609-658.
Bolshov et al., "Investigation of the Dynamic of an Expanding Laser Plume by a Shadowgraphic Technique", Spectrochimica Acta Part B 63, 2008, pp. 324-331.
Borghese et al., "Time-Resolved Spectral and Spatial Description of Laser-Induced Breakdown in Air as a Pulsed, Bright, and Broadband Ultraviolet-Visible Light Source", Applied Optics, vol. 37, No. 18, Jun. 20, 1998, pp. 3977-3983.
Brauch et al., "High-Power Diode Lasers for Direct Applications", Topics Appl. Phys., vol. 78, 1000, pp. 303-368.
Breton et al., "Vacuum-UV Radiation of Laser-Produced Plasmas", Journal of the Optical Society Of America, vol. 63, No. 10, 1973, pp. 1225-1232.
Bridges et al., "Investigation of a Laser-Produced Plasma VUV Light Source", Applied Optics, vol. 25, No. 13, Jul. 1, 1986, pp. 2208-2214.
Bridges, "Characteristics of an Opto-Galvanic Effect in Cesium and Other Gas Discharge Plasmas", J. Opt. Soc. Am., vol. 68, No. 3, Mar. 1978, pp. 352-360.
Bussiahn, R., et al., "Experimental and theoretical investigations of a low-pressure He—Xe discharge for lighting purpose," Journal of Applied Physics, vol. 95, No. 9, May 1, 2004, pp. 4627-4634.
Byer, "Laser-Produced Plasmas: A Compact Soft X-Ray Source with High Peak Brightness", Defence Technical Information Centre, 1989, pp. 1-26.
C10T/C6 Lightshield System Parts Listing, Heraeus Noblelight America LLC, 2015, pp. 1-8.
Cann, "Light Sources in the 0.15-20-μ Spectral Range", Applied Optics, vol. 8, No. 8, 1969, pp. 1645-1661.
Carlhoff et al., "Continuous Optical Discharges at Very High Pressure," Physica 103C, 1981, pp. 439-447.
Carlhoff et al., "High Pressure Optical Discharges", Journal of Physics, 1979, pp. 757-758.
Cedolin et al., "Laser-Induced Fluorescence Measurements of Resonance Broadening in Xenon", Physical Review A, vol. 54, No. 1, 2006, pp. 335-342.
Cedolin, "Laser-Induced Fluorescence Diagnostics Of Xenon Plasmas", 1997, pp. 1-96.
Cermax lamps, including models LX300F, LX1000CF, EX300-10F, EX500-13F, EX900C-10F, EX900C-13F,EX1000C-13F, LX125F, LX175F, LX500CF, EX125-10F, EX175-10F, EX500-10F,EX1000C-10F, EX900-10F;PerkinElmer Optoelectronics.
Cesar et al., "High-power fibre lasers", Nature Photonics, vol. 7, 2013, pp. 861-867.
Chang et al., "Fiber Laser Driven EUV Generation", Conference on Lasers and Electro-Optics, 2005, pp. 2200-2202.
Kopecek et al., "Laser-Induced Ignition of Methane-Air Mixtures at Pressures up to 4 MPa", Laser Physics, vol. 13, No. 11, 2003, pp. 1365-1369.
Korn et al., "Ultrashort 1-kHz Laser Plasma Hard X-ray Source", Optics Letters, vol. 27, No. 10, 2002, pp. 866-868.
Kozlov et al., "Radiative Losses by Argon Plasma and the Emissive Model of a Continuous Optical Discharge", Soy. Phys. JETP, vol. 39, No. 3, Sep. 1974, pp. 463-468.
Kozlov et al., "Sustained Optical Discharges in Molecular Gases," Sov. Phys. Tech. Phys. vol. 49, No. 11, Nov. 1979, pp. 1283-1287.
Kranzusch et al., "Spatial Characterization of Extreme Ultraviolet Plasmas Generated by Laser Excitation of Xenon Gas Targets", Review of Scientific Instruments, vol. 74, No. 2, 2003, pp. 969-974.
Krushelnick et al., "Plasma Channel Formation and Guiding during High Intensity Short Pulse Laser Plasma Experiments", Physical Review Letters, vol. 78, No. 21, 1997, pp. 4047-4050.
Ku et al., "Decay of Krypton 1(s)(2) and 1(s)(3) Excited Species in the Late Afterglow", Physical Review A, vol. 8, No. 6, 1973, pp. 3123-3130.
Kubiak et al., "Scale-up of a Cluster Jet Laser Plasma Source for Extreme Ultraviolet Lithography", SPIE, vol. 3676, 1999, pp. 669-678.
Kuhn, "Laser Engineering", 1998, pp. 303-343, 365-377, 384-440.
Kurkov et al., "CW Medium-Power Fiber Lasers for Near IR Range", Proceedings of SPIE, vol. 5449, 2004, pp. 62-69.
Lackner et al., "The Optical Spark Plug: Window-related Issues", Institute of Chemical Engineering, Vienna University of Technology, 2005, pp. 1-6.
Lange et al., "Tunable Diode Laser Absorption Spectroscopy for Plasmas at Elevated Pressures", Proceedings of SPIE Vo. 4460, 2002, pp. 177-187.
Laufer et al., "Effect of Temperature on the Vacuum Ultraviolet Transmittance of Lithium Fluoride, Calcium Fluoride, Barium Fluoride, and Sapphire", Journal of The Optical Society of America, vol. 55, No. 1, 1965, pp. 64-66.
Laufer, "Introduction To Optics And Lasers In Engineering", 1996, pp. 449-454.
Legall et al., "Spatial and Spectral Characterization of a Laser Produced Plasma Source for Extreme Ultraviolet Metrology", Review of Scientific Instruments, vol. 75, No. 11, 2004, pp. 4981-4988.
Lenses and Curved Mirrors, University of Delaware, Imaging (last visited Dec. 19, 2015), pp. 24-29.
Leonov et al., "Mechanisms of Resonant Laser Ionization", JETP, vol. 8, No. 4, 1997, pp. 703-715.
Lewis et al., "Measurements of CW Photoionization for the Use in Stable High Pressure Tea Laser Discharge",IEEE Nuclear and Plasma Sciences Society, 1975, pp. 14-45.
Li et al., "Density measurements of a high-density pulsed gas jet for laser-plasma interaction studies", Meas. Sci. Technol., vol. 5, 1994, pp. 1197-1201.
Li, "The Advances and Characteristics of High-Power Diode Laser Materials Processing", Optics and Lasers in Engineering, vol. 34, 2000, pp. 231-253.
Liao et al., "An efficient Ni Kα X-ray Source Driven by a High Energy Fiber CPA System", Center for Ultrafast Optical Science, 2007, pp. CP1-4-THU.
Liao et al., "Generation of Hard X-rays Using an Ultrafast Fiber Laser System", Optics Express, vol. 15, No. 21, 2007, pp. 13942-13948.
Light Hammer, 10 Mark II UV Lamp System, Heraeus Noblelight America LLC, 2015, pp. 1-20.
Light Hammer, 6 UV Lamp System Parts Listing, Heraeus Noblelight America LLC, 2015, pp. 1-22.
Lo et al., "Resonance-Enhanced LIBS", Department of Physics, 2002, pp. 15-17.
Lowe et al., "Developments in Light Sources and Detectors for Atomic Absorption Spectroscopy", Spectrochimica Acta Part B., vol. 54, 1999, pp. 2031-2039.

(56) References Cited

OTHER PUBLICATIONS

Lui et al., "Resonance-Enhanced Laser-Induced Plasma Spectroscopy: Time-Resolved Studies and Ambient Gas Effects", Department of Physics, 2002, pp. 19-21.
Luo et al., "Sapphire (0 0 0 1) Surface Modifications Induced by Long-Pulse 1054 nm Laser Irradiation", Applied Surface Science, vol. 253, 2007, pp. 9457-9466.
MacDowell et al., "Reduction imaging with soft x rays for projection lithography", Review Of Scientific Instruments, vol. 63, No. 1, 1992, pp. 737-740.
Maclean et al., "Direct Diode Laser Pumping of a Ti:Sapphire Laser", Institute of Photonics, SUPA, 2009, pp. 1-3.
Magner et al., "Self-Compression of Ultrashort Pulses through Ionization-Induced Spatiotemporal Reshaping", Physical Review Letter, vol. 93, No. 17, 2004, pp. 173902-1-173902-4.
Mahmoud et al., "Ion Formation in Laser-Irradiated Cesium Vapor", Journal of Quantitative Spectroscopy & Radiative Transfer, vol. 102, 2006, pp. 241-250.
Malik et al., "Spectroscopic Measurements on Xenon Plasma in a Hollow Cathode", 2000, J. Phys. D: Appl. Phys., vol. 33, pp. 2037-2048.
Malka et al., "Channel Formation in Long Laser Pulse Interaction with a Helium Gas Jet", Physical Review Letters, vol. 79, No. 16, 1997, pp. 2979-2982.
Mandel'shtam et al., "Investigation of the Spark Discharge Produced in Air by Focusing Laser Radiation II", Soviet Physics JETP, vol. 22, No. 1, 1966, pp. 91-96.
May, "Infrared Optogalvanic Effects in Xenon", Optics Communications, vol. 64, No. 1, 1987, pp. 36-40.
Mazumder et al., "Spectroscopic Studies of Plasma During CW Laser Gas Heating in Flowing Argon", J. Appl. Phys., vol. 62, No. 12, 1987, pp. 4712-4718.
Measures et al., "Fast and Efficient Plasma Heating Through Superelastic Laser Energy Conversion", J. Appl. Phys., vol. 51, No. 7, 1980, pp. 3622-3628.
Measures et al., "Laser interaction based on resonance saturation (LIBORS): an alternative to inverse bremsstrahlung for coupling laser energy into a plasma", 1979, Applied Optics, vol. 18, No. 11, pp. 1824-1827.
Measures et al., "TABLASER: Trace (Element) Analyzer Based on Laser Ablation and Selectively Excited Radiation", Applied Optics, vol. 18, No. 3, 1979, pp. 281-286 (1979).
Measures, "Electron Density and Temperature Elevation of a Potassium Seeded Plasma by Laser Resonance Pumping",J. Quant. Spectrose. Radial. Transfer. vol. 10, 1970, pp. 107-125.
Mercury Vapor Light Source, Model OS-9286A.
Michel et al., "Analysis of Laser-Induced Breakdown Spectroscopy Spectra: The Case for Extreme Value Statistics", Spectrochimica Acta Part B, vol. 62, 2007, pp. 1370-1378.
Michel et al., "Laser-Induced Breakdown Spectroscopy of Bulk Aqueous Solutions at Oceanic Pressures: Evaluation of Key Measurement Parameters", Applied Optics, vol. 46, No. 13, 2007, pp. 2507-2515.
Milian et al., "Dynamic Compensation of Chromatic Aberration in a Programmable Diffractive Lens", Optical Express, vol. 14, No. 20, 2006, pp. 9103-9112.
Millard et al., "Diode Laser Absorption Measurements of Metastable Helium in Glow Discharges", Plasma Sources Sci. Technol., vol. 7, 1998, pp. 288-394.
Mills et al., "Argon-Hydrogen-Strontium Discharge Light Source", IEEE Transactions On Plasma Science, vol. 30, No. 2, 2002, pp. 639-652.
Mills et al., "Excessively Bright Hydrogen-Strontium Discharge Light Source Due to Energy Resonance of Strontium with Hydrogen", J. Plasma Physics, vol. 69, Part 2, 2003, pp. 131-158.
Mizoguchi et al., "Development of Light Source for Lithography at Present and for the Future", vol. 59, No. 166, 2013, pp. 1-7.
Mizoguchi et al., Development of CO2 Laser Produced Xe Plasma EUV Light Source for Microlithography, Proc. Of SPIE, vol. 6151, 2006, pp. 61510S-1.
Hanselman, "Laser-Light Thomson and Rayleigh Scattering in Atmospheric-Pressure Laboratory Plasmas", 1993, Department of Chemistry, pp. ii-385.
Hansson et al., "Liquid-Xenon-Jet Laser-Plasma Source for EUV Lithography", SPIE, vol. 4506, 2001, pp. 1-8.
Hansson, "Laser-Plasma Sources For Extreme-Ultraviolet Chaps. 5 & 6", 2003, pp. 1-58.
Harris, "A Century of Sapphire Crystal Growth Proceedings", Proceedings of the 10th DoD Electromagnetic Windows Symposium Norfolk, 2004, pp. 1-56.
Harris, "Review Of Navy Program To Develop Optical Quality Diamond Windows And Domes", Naval Air Systems Command, 2002, pp. 1-16.
Harrison et al., "Low-threshold, cw, All-solid-state Ti:Al203 Laser", Optics Letter, vol. 16, No. 8, 1991, pp. 581-583.
Hawke et al., "An Apparatus for High Pressure Raman Spectroscopy", Rev. Sci. Instrum., vol. 45, No. 12, 1974, pp. 1598-1601.
Haysom, "Quantum Well Intermixing of InGaAs(P)/InP Heterostructures", Department of Physics, 2001, pp. ii-224.
Hebner et al., "Measured Pressure Broadening and Shift Rates of the 1.73 μm (5d[3/21]1-6p[5/2]2) Transition of Xenon", Applied Physics Letters, vol. 59, No. 9, 1991, pp. 537-539.
Hecht, "Fiber Lasers: Fiber Lasers: The state of the art, Laser Focus World", 2012, pp. 1-11.
Hecht, "Refraction", Optics (Third Edition), Chapter 4, 1998, pp. 100-101.
High Power Diode Laser, Rofin-Sinar Technologies, Inc., 2000, pp. 1-26.
Horn et al., "Evaluation and Design of a Solid-State 193 nm OPO-Nd:YAG Laser Ablation System", Spectroch mica Acta Part B, vol. 58, 2003, pp. 1837-1846.
Hou et al., "Fiber Laser For EUV Generation", EUV Source Workshop, 2006.
Hou et al., "High Intensity Fiber Lasers: Emerging New Applications and New Fiber Technologies", IEEE LEOS Newsletter, 2007, pp. 22-25.
Hou et al., "High Power Fiber Laser Driver for Efficient EUV Lithography Source with Tin-Doped Water Droplet Targets", Optics Expres,, vol. 16, No. 2, 2008, pp. 965-974.
Hu et al., "Laser Induced Stabilisation of the Welding Arc", 2005, Science and Technology of Welding and Joining, vol. 10, No. 1, pp. 76-81.
Huffman et al., "Absorption Coefficients of Xenon and Argon in the 600-1025 Angstrom Wavelength Regions", The Journal of Chemical Physocs, vol. 39, 1963, pp. 902-909.
Hughes, "Plasmas And Laser Light", University of Essex, 1975, pp. 200-272.
I.M. Beterov et al. "Resonance radiation plasma (photoresonance plasma)", Soy. Phys. Usp. vol. 31, No. 66, 1988, pp. 535-554.
Instruction Manual: LDC-3722 Laser Diode Controller, ILX Lightwave Corporation, 1990, pp. 1-1-4-33.
Zimakov, "Continuous Optical Discharges Sustained by Near-IR Laser Radiation", 42th international conference on plasma physics and CF, 2015, p. 1.
Zhang et al., "Designing a High Performance TEC Controller", Proceedings of SPIE vol. 4913, 2002, pp. 177-183.
Jahier et al.,"Implementation of a Sapphire Cell with External Electrodes for Laser Excitation of a Forbidden Atomic Transition in a Pulsed E-Field", Eur. Phys. J.D., vol. 13, 2001, pp. 221-229.
Jansson et al., "Liquid-Tin-Jet Laser-Plasma Extreme Ultraviolet Generation", Applied Physics Letters, vol. 84, No. 13, 2004, pp. 2256-2258.
Jaroszynski et al., "Radiation Sources Based on Laser—Plasma Interactions", Phil. Trans. R. Soc. vol. 364,2006, pp. 689-710.
Jauregui et al., "High-power Fibre Lasers", Nature Photonics, vol. 7, 2013, pp. 861-867.
Jeng et al., "Theoretical Investigation of Laser-Sustained Argon Plasmas," J. Appl. Phys., vol. 60, No. 7, Oct. 1, 1986, pp. 2272-2279.
Jinno et al., "Luminance and efficacy improvement of low-pressure xenon pulsed fluorescent lamps by using an auxiliary external electrode", J. Phys. D: Appl. Phys., vol. 40, 2007, pp. 3889-3895.

(56) References Cited

OTHER PUBLICATIONS

Jinno et al., "The Afterglow Characteristics of Xenon Pulsed Plasma for Mercury-Free Fluorescent Lamps", Czech. J. Phys., vol. 50, 2000, pp. 433-436.
Johnson, "Ultraviolet Emission Spectra of High-Pressure Rare Gases", 1970, Journal Of The Optical Society Of America,, vol. 60, No. 12, pp. 1669-1674.
Joshi et al., "Laser-Induced Breakdown Spectroscopy for In-Cylinder Equivalence Ratio Measurements in Laser-Ignited Natural Gas Engines", Applied Spectroscopy, vol. 63, No. 5, 2009, pp. 549-554.
Kaku et al., "Vacuum Ultraviolet Spectroscopic System Using a Laser-Produced Plasma", Journal of Applied Physics, vol. 42, 2003, pp. 3458-3462.
Kaku et al., "Vacuum Ultraviolet Transmission Spectroscopic System using a Laser-Produced Plasma", The Japan Society of Applied Physics, vol. 42, No. 6R, pp. 149-152.
Keefer et al., "Experimental Study of a Stationary Laser-Sustained Air Plasma," Journal of Applied Physics, vol. 46, No. 3, Mar. 1975, pp. 1080-1083.
Keefer et al., "Power Absorption Laser Sustained Argon Plasmas", AIAA Journal, vol. 24, No. 10, 1986, pp. 1663-1669.
Keefer, "Laser-Sustained Plasmas", 1989, pp. 169-206.
Kennedy et al., "A Review of the Use of High Power Diode Lasers in Surface Hardening, Journal of Materials Processing Technology", vol. 155-156, 2004, pp. 1855-1860.
Keyser et al. "Studies of High-Repetition-Rate Laser Plasma EUV Sources from Droplet Targets", Applied Physics A, vol. 77, 2003, pp. 217-221.
Kim et al., "Development of an In Situ Raman Spectroscopic System for Surface Oxide Films on Metals and Alloys in High Temperature Water, Nuclear Engineering and Design", vol. 235, 2005, pp. 1029-1040.
Kindel et al., Measurement of Excited States Density and the VUV-Radiation in the Pulsed Xenon Medium Pressure Discharge, Contrib. Plasma Phys., vol. 36, 1996, pp. 711-721.
Kirk et al., "Methods and Systems for Providing Illumination of a Specimen for Inspection" U.S. Appl. No. 60/806,204, filed Jun. 29, 2006, 48 pages.
Kirk et al., "Methods and Systems for Providing Illumination of a Specimen for Inspection", U.S. Appl. No. 60/759,846, filed Jan. 17, 2006, 18 pages.
Kirk et al., "Methods and Systems for Providing Illumination of a Specimen for Inspection", U.S. Appl. No. 60/772,425, filed Feb. 9, 2006, 20 pages.
Klein, "Measurements of Spectral Emission and Absorption of a High Pressure Xenon Arc in the Stationary and the Flashed Modes", 1968, pp. 677-685.
Klocke et al., "Investigation into the Use of High Power Diode Lasers for Hardening and Thermal Conduction Welding of Metals", SPIE, vol. 3097, 1997, pp. 592-598.
Knyazev, "Photoresonance Plasma Production by Excimer Lasers as a Technique for Anode-plasma Formation", Nucl. Instr. and Meth. in Phys. Res. A, vol. 415, 1998, pp. 525-532.
Kolb et al., "Low Optical Loss Synthetic Quartz", Mat. Res. Bull. vol. 7, 1972, pp. 397-406.
Kondow et al., "Temperature Dependence of Lasing Wavelength in a GaInNAs Laser Diode", IEEE Photonics Technology Letters, vol. 12, No. 7, 2000, pp. 777-779.
Kopecek et al., "Laser Ignition of Methane-Air Mixtures at High Pressures and Diagnostics", Journal of Engineering for Gas Turbines and Power, vol. 127, 2005, pp. 213-219.
Schohl et al., "Absolute Detection of Metastable Rare Gas Atoms by a CW Laser Photoionization Method", Z. Phys. D—Atoms, Molecules and Clusters, vol. 21, 1991, pp. 25-39.
Jin et al., New Laser Plasma Source for Extreme-Ultraviolet, 1995, pp. 2256-2258.
Shaw et al., "Preliminary Design of Laser-Induced Breakdown Spectroscopy for Proto-Material Plasma Exposure Experiment", Review Of Scientific Instruments, vol. 85, 2014, pp. 11D806-1-11D806-3.
Shen et al., "Highly Efficient Er, Yb-Doped Fiber Laser with 188W Free-Running and >100W Tunable Output Power", Optics Express, vol. 13, No. 13, 2005, pp. 4916-4921.
Shigeyoshi et al., "Near Infrared Absorptions of Neon, Argon, Krypton, and Xenon Excited Diatomic Molecules", J. Chem. Phys., vol. 68, 1978, pp. 7595-4603.
Shimada et al., "Characterization of Extreme Ultraviolet Emission from Laser-Produced Spherical Tin Plasm Generated with Multiple Laser Beams", Applied Physics Letters, vol. 86, 2005, pp. 051501-1-051501-3.
Shirakawa et al., "CW 7-W, 900-nm-wide Supercontinuum Source by Phosphosilicate Fiber Raman Laser and Highnonlinear Fiber", Proceedings of SPIE, vol. 5709, 2005, pp. 199-205.
Sidawi, "Fiber Lasers Gain Power", www.rdmag.com, 2003, p. 26.
Silfvast et al., "Comparison of Radiation from Laser-Produced and DC-Heated Plasmas in Xenon", Applied Physics Letters, vol. 25, No. 5, 1974, pp. 274-277.
Silfvast, Laser Fundamentals, Schhol of Optics, 2004, pp. 1-6, pp. 199-222 & 565-68.
Skenderovic et al., "Laser-ignited glow discharge in lithium vapor", Physical Review A, vol. 62, 2000, pp. 052707-1-052707-7.
Smith, "Gas-Breakdown Dependence on Beam Size and Pulse Duration with 10.6-μ Wavelength Radiation", Applied Physics Letters, vol. 19, No. 10, 1971, pp. 405-408.
Snyder et al., "Laser-Induced Breakdown Spectroscopy of High-Pressure Bulk Aqueous Solutions", Applied Spectroscopy, vol. 60, No. 7, 2006, pp. 786-790.
Sobota et al., "The Role of Metastables in the Formation of an Argon Discharge in a Two-Pin Geometry", IEEE Transactions on Plasma Science, vol. 38, No. 9, 2010, pp. 2289-2299.
Song et al., "Mechanisms of Absorption in Pulsed Excimer Laser-Induced Plasma", Appl. Phys. A, vol. 65, 1997, pp. 477-485.
Stamm, "Extreme Ultraviolet Light Sources for use in Semiconductor Lithography—State of the Art and Future Development", J. Phys. D: Appl. Phys., vol. 37, 2004, pp. 3244-3253.
Stulen et al., "Developing A Soft X-Ray Projection Lithography Tool", AT & T Technical Journal, 1991, pp. 37-48.
Su et al., "Note: A Transient Absorption Spectrometer Using an Ultra Bright Laser-Driven Light Source", Review Of Scientific Instruments, vol. 84, 2013, pp. 086106-1-386106-3.
Sundvold et al., "Optical Firing System", Proc. Of SPIE, vol. 5871, 2005, pp. 587104-1-587104-10.
Super-Quiet Xenon Lamp Super-Quiet Mercury-Xenon Lamp, Hamamatsu Product Information, Nov. 2005, 16 pages.
Surzhikov, "Numerical Simulation of Subsonic Gasdynamical Instabilities Near Heat Release Regions", AIAA, 1996, pp. 1-11.
Generalov et al., "Continuous Optical Discharge," ZhETF Pis. Red. 11, No. 9, May 5, 1970, pp. 302-304.
Szymanski et al., "Nonstationary Laser-Sustained Plasma", Journal of Applied Physics, vol. 69, No. 6, 1990, pp. 3480-3484.
Szymanski et al., "Spectroscopic Study of a Supersonic Jet of Laser-Heated Argon Plasma", J. Phys. D: Appl. Phys., vol. 30, 1997, pp. 998-1006.
Takahashi et al., "Numerical Analysis of Ar(2) Excimer Production in Laser-Produced Plasmas", Journal of Applied Physics, 1998, pp. 390-393.
Takahashi et al.,"Ar(2) Excimer Emission from a Laser-Heated Plasma in a High-Pressure Argon Gas", Applied Physics Letters, vol. 77, No. 5, 2000, pp. 4115-4117.
Tam et al., "Plasma Production In a Cs Vapor by a Weak cw Laser Beam at 6010 A, Optics Communications", vol. 21, No. 3, 1977, pp. 403-407.
Tam, "Dynamic Response of a cw Laser-produced Cs Plasma to Laser Modulations", Appl. Phys. Lett., vol. 35, No. 9, 1979, pp. 683-685.
Tam, "Quasiresonant Laser-Produced Plasma: An Efficient Mechanism for Localized Breakdown", J. Appl. Phys., vol. 51, No. 9, 1980, pp. 4682-4687.

(56) References Cited

OTHER PUBLICATIONS

Tanaka et al., "Production of Laser-Heated Plasma in High-Pressure Ar Gas and Emission Characteristics of Vacuum Ultraviolet Radiation from Ar(2) Excimers", Appl. Phys. B, vol. 74, 2002, pp. 323-326.
Tansu, "Novel Quantum-Wells GaAs-Based Lasers for All Transmission Windows in Optical Communication", 2003, pp. i-291.
Theriault et al., "A Real-Time Fiber-Optic LIBS Probe for the In Situ Delineation of Metals in Soils", Field Analytical Chemistry and Technology, vol. 2, No. 2, 1998, pp. 117-125.
Theriault et al., "Field Deployment of a LIBS Probe for Rapid Delineation of Metals in Soils", SPIE, vol. 2835, 1996, pp. 83-88.
Thermoelectric Cooler Controller, Analog Devices Inc., 2002, pp. 1-24.
Tichenor et al., "Soft-x-ray projection lithography experiments using Schwarzschild imaging optics", Applied Optics, vol. 32, No. 34, 1993, pp. 7068-7071.
Tombelaine, et al. "Spectrally Shaped Light From Supercontinuum Fiber Light Sources", Optics Communications, vol. 284, Issue 7, Apr. 1, 2011, pp. 1970-1974.
Tooman, "The Sandia Laser Plasma Extreme Ultraviolet and Soft X-ray (XUV) Light Source", SPIE vol. 664, 1986, pp. 186-191.
Topanga Advanced Plasma Lighting APL1000-4000SF, p. 1.
Topanga Advanced Plasma Lighting APL1000-5000SF, p. 1.
Topanga Advanced Plasma Lighting APL250-4000BF, p. 1.
Topanga Advanced Plasma Lighting APL250-4000SF, p. 1.
Topanga Advanced Plasma Lighting APL250-5500SF, p. 1.
Topanga Advanced Plasma Lighting APL400-4000BF, p. 1.
Topanga Advanced Plasma Lighting APL400-4000SF, p. 1.
Topanga Advanced Plasma Lighting APL400-5500BF, p. 1.
Topanga Advanced Plasma Lighting APL400-5500SF, p. 1.
Topanga's Advanced Plasma Lighting System, Topanga USA, 2016, pp. 1-5.
Treshchalov et al., "Spectroscopic Diagnostics of Pulsed Discharge in High-Pressure Argon", Quantum Electrics, vol. 40, No. 3, 2010, pp. 234-240.
Tsuboi et al., "Nanosecond Imaging Study on Laser Ablation of Liquid Benzene", Appl. Phys. Lett, vol. 64, 1994, pp. 2745-2747.
Uhlenbusch, et al., "Hβ-Line Profile Measurements in Optical Discharges", J. Quant. Spectrosc. Radiat. Transfer vol. 44, No. 1, 1990, pp. 47-56.
User Manual: Cyberlight, Cyberlight Cx, Cyberlight Sv (Version 2.0), High End Systems, Inc., (1996).
Ushio Super-High Pressure Mercury Lamps, including USH-102D, USH-102DH, USH-205DP, USH-2055, USH-206D/M4, USH-250D, USH-250BY, USH-350DS, USH-351DS, USH-350DP, USH-450G5, USH-450GL, USH-500BY,USH-500MB, USH-502MB, USH-500T, USH-505MC, USH-5085, USH-508SA, USH-5095, USH-1000DW,USH-1000MC, USH-1000KS, USH-1002DW, Ushio.
Vadla et al., "Resonantly Laser Induced Plasmas in Gases: The Role of Energy Pooling and Exothermic Collisions in Plasma Breakdown and Heating", Spectrochimica Acta Part B, vol. 65, 2010, pp. 33-45.
Vampola, "P78-2 Engineering Overview", Defence Technical Information Centre, 1981, pp. 1-36.
Vukanovic et al., "A New Type of D.C. Arc as Spectrochemical Light Source", Spectrochimica Acta, vol. 29B, 1974, pp. 33-36.
Wang, "Self-Assembled Indium Arsenide Quantum-Dash Lasers of Indium Phosphide Substrates", Electrical and Computer Engineering, 2002, pp. vi-150.
Waynant et al., "Electro-Optics Handbook", Eds., 20002, pp. 1-1000.
Webb et al., Handbook Of Laser Technology And Applications, Applications, vol. III, 2004, pp. 1587-1611.
Wei, "Transparent Ceramic Lamp Envelope Materials", J. Phys. D: Appl. Phys., vol. 38, 2005, pp. 3057-3065.
Weinrotter et al., "Application of Laser Ignition to Hydrogen-Air Mixtures at High Pressures", International Journal of Hydrogen Energy, vol. 30, 2005, pp. 319-326.
Weinrotter et al., "Laser Ignition of Engines", Laser Physics, vol. 15, No. 7,2005, pp. 947-953.
Wiehle et al., "Dynamics of Strong-Field Above-Threshold Ionization of Argon: Comparison Between Experiment and Theory", Physical Review A, vol. 67, 2003, pp. 063405-1-063405-7.
Wieman et al., "Using Diode Lasers for Atomic Physics", Rev. Sci. Instrum., vol. 62, No. 1, 1991, pp. 1-20.
Wilbers et al., "The Continuum Emission of an Arc Plasma," J. Quant. Spectrosc. Radiat. Transfer, vol. 45, No. 1, 1991, pp. 1-10.
Wilbers et al., "The VUV Emissivity of a High-Pressure Cascade Argon Arc from 125 to 200 nm," J. Quant. Spectrosc. Radiat. Transfer, vol. 46, 1991, pp. 299-308.
Winter et al., "Experimental and Theoretical Investigations of a Helium-Xenon Discharge in Spot Mode", 28th ICGQP, 2007 pp. 1979-1982.
Wood, "Atomic Processes: Bound-bound transitions (Einstein coefficients)", available at http://www-star.st-and.ac.uk-kw25/teaching/nebulae/lecture06_einstein.pdf, 2014, pp. 1-10.
World Record Powers Achieved in Single-Mode Fiber Lasers—Powers Scalable to IkW and Beyond, Southampton Photonics, Inc., 2003, pp. 1-2.
Wroblewski et al., "An Experimental Investigation of the Continuous Optical Discharge", Journal of Physique, 1979, pp. 733-734.
Wu et al., "Extreme Ultraviolet Lithography: Towards the Next Generation of Integrated Circuits", vol. 7, 2009, pp. 1-4 (2009).
Xenakis et al., "Laser-plasma X-ray Generation Using an Injection-mode-locked XeCl Excimer Laser", J. Appl. Phys., vol. 71, No. 1, 1992, pp. 85-93.
Xu et al., "Wavelength- and Time-Resolved Investigation of Laser-Induced Plasmas as a Continuum Source", Applied Spectroscopy, vol. 47, No. 8, 1993, pp. 1134-1139.
Yamada et al., "Ionization Mechanism of Cesium Plasma Produced by Irradiation of Dye Laser", 1992,Jpn. J. Appl. Phys. vol. 31, pp. 377-380.
Swiderski et al., "Q-switched Nd-doped double-clad fiber laser", Opto Electronics Review, vol. 13, No. 3, 2005, pp. 187-191.
Anonymous: "Toroidal Mirrors TRseries: Shimadzu Corporation", Oct. 27, 2020, XP093222739, 7 pages. Retrieved from the Internet:URL:https://web.archive.org/web/20201027085809/https://www.shimadzu.com/opt/products/aspherical/o-k25cur0000007p3b.html.
Bakshaev et al., "Measurements of Neutron Emission from a Z-pinch Constriction", ISSN 1063-780X, Plasma Physics Reports, vol. 32, No. 7, 2006, pp. 531-538.
Bakshaev et al., "Study of the Plasma in a Preformed Z-pinch Constriction", Plasma Physics Reports, vol. 27, No. 12, 2001, pp. 1039-1047.
Bakshaev et al., "Theoretical and Experimental Study for Possibility of Nuclear Burn Wave Initiation in Z-Pinch due to M=0 Instability Development", Russian Research Center Kurchatov Institute, 1999, pp. 879-882.
Office Action Received for Taiwan Patent Application No. 113112042, mailed on Jun. 30, 2025, 10 pages including 4 pages of English Translation.
Reisman et al., "Inductively coupled plasma light source driven by an all solid-state pulsed power system", Applied Physics Letters, vol. 123, Issue 18, Nov. 2, 2023, 6 pages. [retrieved on Oct. 17, 2024], Retrieved from <https://doi.org/10. 1063/5.0174510>.
Vikhrev et al., "Development of sausage-type instability in a Z-pinch plasma column", Nuclear Fusion, 1993, vol. 33, No. 2, pp. 311-321.
Vikhrev et al., "Neutron Generation from Z-Pinches", ISSN 1063-780X, Plasma Physics Report, vol. 33, No. 5, 2007, pp. 3560-380.
International Preliminary Report on Patentability received for corresponding PCT Application No. PCT/US2024/014239 mailed on Dec. 18, 2025, 9 pages.

* cited by examiner

DUAL-OUTPUT LASER-DRIVEN LIGHT SOURCE

The section headings used herein are for organizational purposes only and should not be construed as limiting the subject matter described in the present application in any way.

INTRODUCTION

Numerous commercial and academic applications have a need for broad band high brightness light in the 170 nm to 2.1 micron spectrum range. For example, broad-band high-brightness light is needed for numerous industrial applications, including photolithography, metrology, accelerated life testing, photoresist development and testing, defect inspection, and microscopy. Other applications for broad-band high brightness light include spectroscopy, aerial imaging, and blank mask inspection. These and other applications require broad-band high-brightness light sources that have high reliability, small physical size, low fixed cost, low operating cost, flexible operating space to optimize the operation to the desired application and low complexity. Known broad-band high-brightness light sources have limited performance and usefulness because of various engineering difficulties. Also, known broad-band high-brightness light sources are typically single output light sources with limited functionality.

SUMMARY

A dual-output light source includes a laser-driven light source that generates light from a thermal plasma over an angular range of emission of at least 180 degrees. A first and second off-axis conical mirror are positioned within the at least 180 degrees of emission of the thermal plasma so that light generated by the plasma propagating from a first region of emission strikes a first focal point of the first off-axis conical mirror and light generated by the plasma propagating from a second region of emission strikes a first focal point of the second off-axis conical mirror. The first and second off-axis conical mirrors reflect light in a respective first and second optical path. The first and second off-axis conical mirrors can include optical filters with different filter functions. A first optical filter with a first filter function is positioned in the first optical path so that light is passed with a first optical spectrum to a first output that is positioned at a second focal point of the first off-axis conical mirror. Similarly, a second optical filter is positioned in the second optical path so that light is passed with a second optical spectrum to a second output that is positioned at a second focal point of the second off-axis conical mirror.

A method of generating light according to the present teaching includes producing a thermal plasma that generates light over an angular range of emission of at least 180 degrees. The generated light is propagated to a first focal point of a first mirror so that it reflects the generated light in a first optical path and is propagated to a first focal point of a second mirror so that it reflects the generated light in a first optical path. Light in the first optical path is filtered to form a first output optical beam with a first optical spectrum. Light in the second optical path is filtered to form a second output optical beam with a second optical spectrum. The first output optical beam is propagated to a first output at a second focal point of the first mirror. The second output optical beam is propagated to a second output at a second focal point of the second mirror.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings described below are for illustration purposes only. The drawings are not necessarily to scale; emphasis is instead generally being placed upon illustrating principles of the teaching. The drawings are not intended to limit the scope of the Applicant's teaching in any way.

DESCRIPTION OF VARIOUS EMBODIMENTS

Figure 1A:
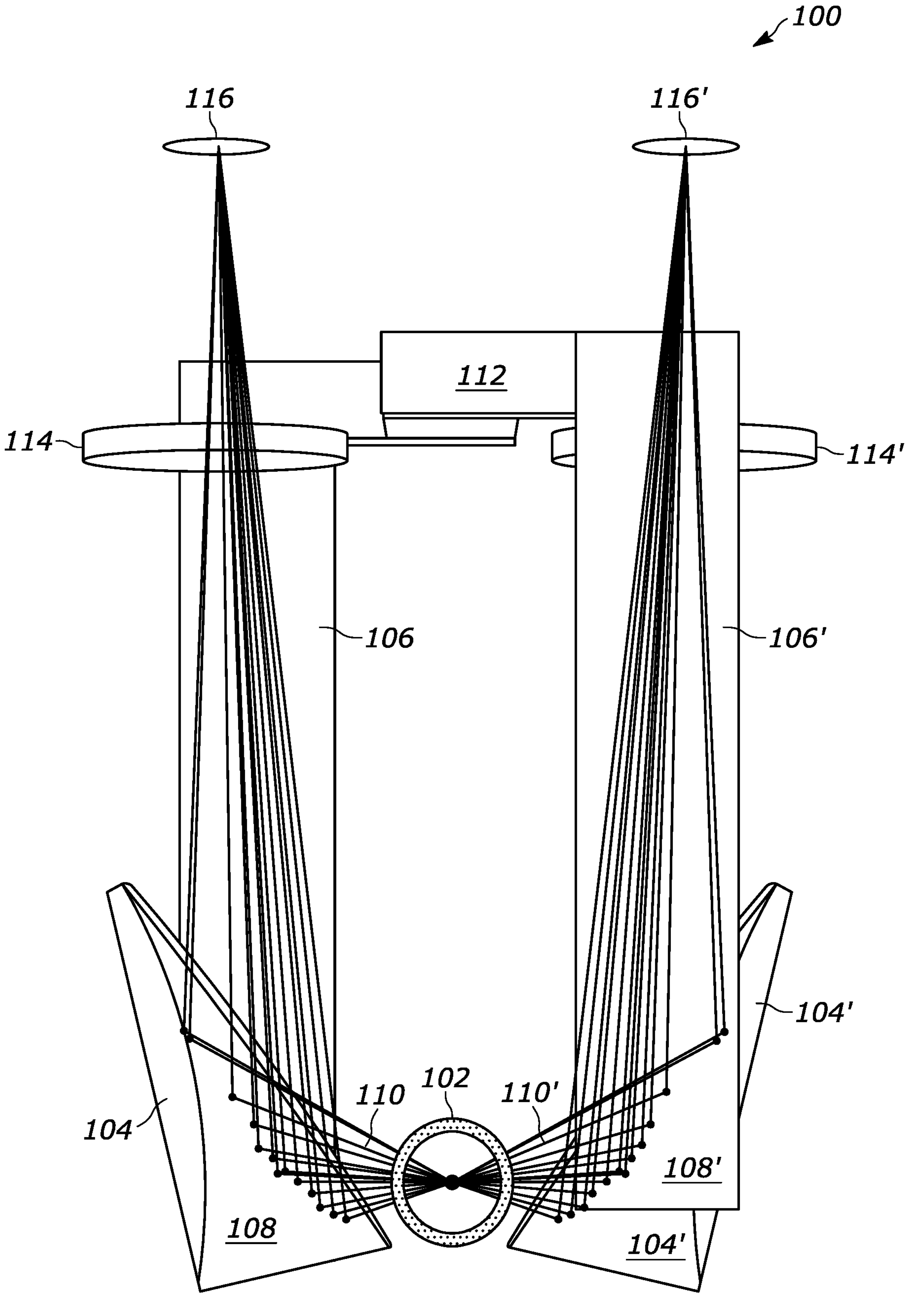
FIG. 1A illustrates a side-view of an embodiment of a dual-output light source optical system configured according to the present teaching that includes a pair of off-axis conical mirrors that couple flux from the plasma to two separate output channels.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications, and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

The present teaching relates to broad-band light that can operate at relatively high brightness. The term "broad-band" light as used herein refers to light having a wavelength in the 170 nm to 2.1 micron spectrum range. That is, the term "broad-band" light refers to light in the deep ultraviolet to the infrared region of the electromagnetic spectrum. It is technically difficult to generate high-brightness light over this large range of the electromagnetic spectrum. It is particularly difficult to generate light with different spectral characteristics at multiple outputs over this large range of the electromagnetic spectrum.

Broad-band high-brightness light sources are used in numerous state-of-the art optical measurement and exposure applications. It is desirable that these broad-band high-brightness light sources be configured to accommodate numerous use cases, some of which require dual or multiple outputs that provide light with different optical properties. Currently, broad-band high-brightness light sources with such multiple outputs and high performance are not available in the market. It should be understood that many aspects of the present teaching are described in connection with a dual output light sources. However, it is understood that the present teachings can be extended to a plurality of outputs including three or more outputs that is useful for many applications requiring outputs with different spectral properties and/or that use parallel operation.

Plasmas can be used to generate a wide spectral range of photons. For example, plasmas generated according to the present teaching can generate light from the deep ultraviolet spectrum to the infrared spectrum. The methods and apparatus of the present teachings relate to plasma generated light sources.

FIG. 1A illustrates a side-view of an embodiment of a dual-output light source system 100 configured according to the present teaching. In one embodiment, the light source system 100 includes a laser-driven light source 102 that generates broad-band light from a thermal plasma formed in the center of a bulb or chamber, were the bulb or chamber has some regions that are substantially transparent to electromagnetic radiation having desired wavelengths to allow light to pass through the chamber or bulb. In various embodiments, the laser-driven light source 102 comprises a broad-band light source that emits ultraviolet, visible light, and/or near-infrared light.

Light is emitted from the plasma at the center of the bulb in all directions. The bulb or chamber is transparent to electromagnetic radiation having desired wavelengths over an angular range of emission of at least 180 degrees. See, for example, U.S. Pat. No. 11,587,781, entitled "Laser-Driven Light Source with Electrodeless Ignition", which is assigned to the present assignee, for an example of a state-of-the-art laser-driven light source. Such electrodeless light sources are available from Energetiq, a Hamamatsu Company, located in Wilmington, MA. These light sources are based on a Z-pinch plasma and they avoid electrodes entirely by inductively coupling current into the plasma. The plasma in these light sources is magnetically confined away from the source walls, minimizing the heat load and reducing debris and providing excellent open-loop spatial stability, and stable repeatable power output. Such light sources are highly desirable for applications requiring high brightness with a compact physical footprint.

The light source system 100 also includes first and second off-axis conical mirrors 104, 104' that couple light flux from the plasma light source 102 into a first and a second separate optical output channel 106, 106'. The first and the second separate optical output channel 106, 106' may be referred to as a first and a second optical path 106. 106'. In some embodiments of light sources according to the present teaching, at least one of the first and second off-axis conical mirrors 104, 104' are movable so that a perpendicular to the surface of the first off-axis conical mirror moves relative to output apertures at outputs 116, 116' of the light source. Also, in one embodiment of the light source, at least one of the first and second off-axis conical mirrors 104, 104' is an off-axis ellipsoidal mirror. In another embodiment of the light source, at least one of the first and second off-axis conical mirrors 104, 104' is an off-axis-parabolic mirror.

The first off-axis conical mirror 104 includes a reflective surface 108 that is positioned proximate to a first region of emission 110 of the laser-driven light source 102 so that light generated by the thermal plasma and propagating from the first region of emission 110 of the laser-driven light source 102 strikes a first focal point of the first off-axis conical mirror 104 and is then reflected away in a first optical path 106, where the dots show ray tracing.

Similarly, the second off-axis conical mirror 104' includes a reflective surface 108' that is positioned proximate to a second region of emission 110' of the laser-driven light source 102 that is within the at least 180-degree angular range of emission. Light from the second region of emission 110' is reflected by the reflective surface 108' into a second optical path 106', where the dots show ray tracing. The generated light propagating from the second region of emission 110' of the laser-driven light source 102 strikes a first focal point of the second off-axis conical mirror 104'. In many embodiments, the reflective surfaces comprise a material that is highly reflective over the spectral regions of interest. For example, gold and aluminum coatings can be used.

At least one of the reflective surface 108 on the first off-axis conical mirror 104 that is positioned proximate to the first region of emission 110 of the laser-driven light source 102 and the reflective surface 108' on the second off-axis conical mirror 104' that is positioned proximate to a second region of emission 110' includes an optical coating other than a reflective mirror coating. For example, at least one of these surfaces 108, 108' can include an optical coating that forms an optical filter. Such optical filters can have the same optical filter function for each surface 108, 108', or the optical filters can have an optical filter for one surface 108 and a different optical filter function for the other surface 108'. The filter functions can be, for example, a bandpass filter function or a high or low pass filter function. In many embodiments of the light source 100 of the present teaching, both the surface 108 on the first off-axis conical mirror 104 that is positioned proximate to the first region of emission 110 of the laser-driven light source 102 and the surface 108' on the second off-axis conical mirror 104' that is positioned proximate to a second region of emission 110' include a coating that forms an optical filter so that the first off-axis conical mirror 104 comprises a filter with a first optical bandwidth and the second off-axis conical mirror 104' comprises a filter with second optical bandwidth, where the first and second optical bandwidth are not equal and do not have the same center wavelength.

For example, in one particular embodiment of the light source of the present teaching, the first off-axis conical mirror 104 includes an optical coating configured as an optical filter with a bandwidth in the ultraviolet region of the electromagnetic spectrum and the second off-axis conical mirror 104' is configured with an optical coating with a bandwidth in the visible region of the electromagnetic spectrum. In another particular embodiment, the first off-axis conical mirror 104 includes an optical coating configured as an optical filter with a bandwidth in the ultraviolet region of the electromagnetic spectrum and the second off-axis conical mirror 104' is configured with an optical coating with a bandwidth in the near-infrared region of the electromagnetic spectrum. In yet another particular embodiment, the first off-axis conical mirror 104 includes an optical coating configured as an optical filter with a bandwidth in the near-infrared region of the electromagnetic spectrum and the second off-axis conical mirror 104' is configured with an optical coating with a bandwidth in the visible region of the electromagnetic spectrum. In another particular embodiment, the first off-axis conical mirror 104 and the second off-axis conical mirror 104' both include optical coatings configured as optical filters with the same bandwidth. In yet another specific embodiment, a first optical filter 114 and a second optical filter 114' are configured to filter substantially the same bandwidth of the electromagnetic spectrum.

A first optical filter 114 is positioned in the first optical path 106. The first optical filter 114 comprises a first filter function that passes light with a first optical spectrum to a first output 116 that is positioned at a second focal point of the first off-axis conical mirror 104. Similarly, a second optical filter 114' is positioned in the second optical path 106'. The second optical filter 114' comprises a second filter function that passes light with a second optical spectrum to a second output 116' that is positioned at a second focal point of the second off-axis conical mirror 104'. In one practical configuration, a mechanical frame 112 supports the first and second optical filters 114, 114'. The first and second optical filters 114, 114' can be separate, stand-alone filters that can have filter functions that are different or the same as the filter functions of any optical filters configured on the first off-axis conical mirror 104 and configured on the second off-axis conical mirror 104'.

The first and second optical outputs 116, 116' can be configured in various ways that are suitable for the particular application of the dual-output light source 100. In some embodiments, the first optical output 116 is configured with a first numerical aperture and the second optical output 116' is configured with a second numerical aperture that is different from the first numerical aperture so that the dual-output light source 100 can couple generated light into two different systems with different optical input configurations.

Figure 2:
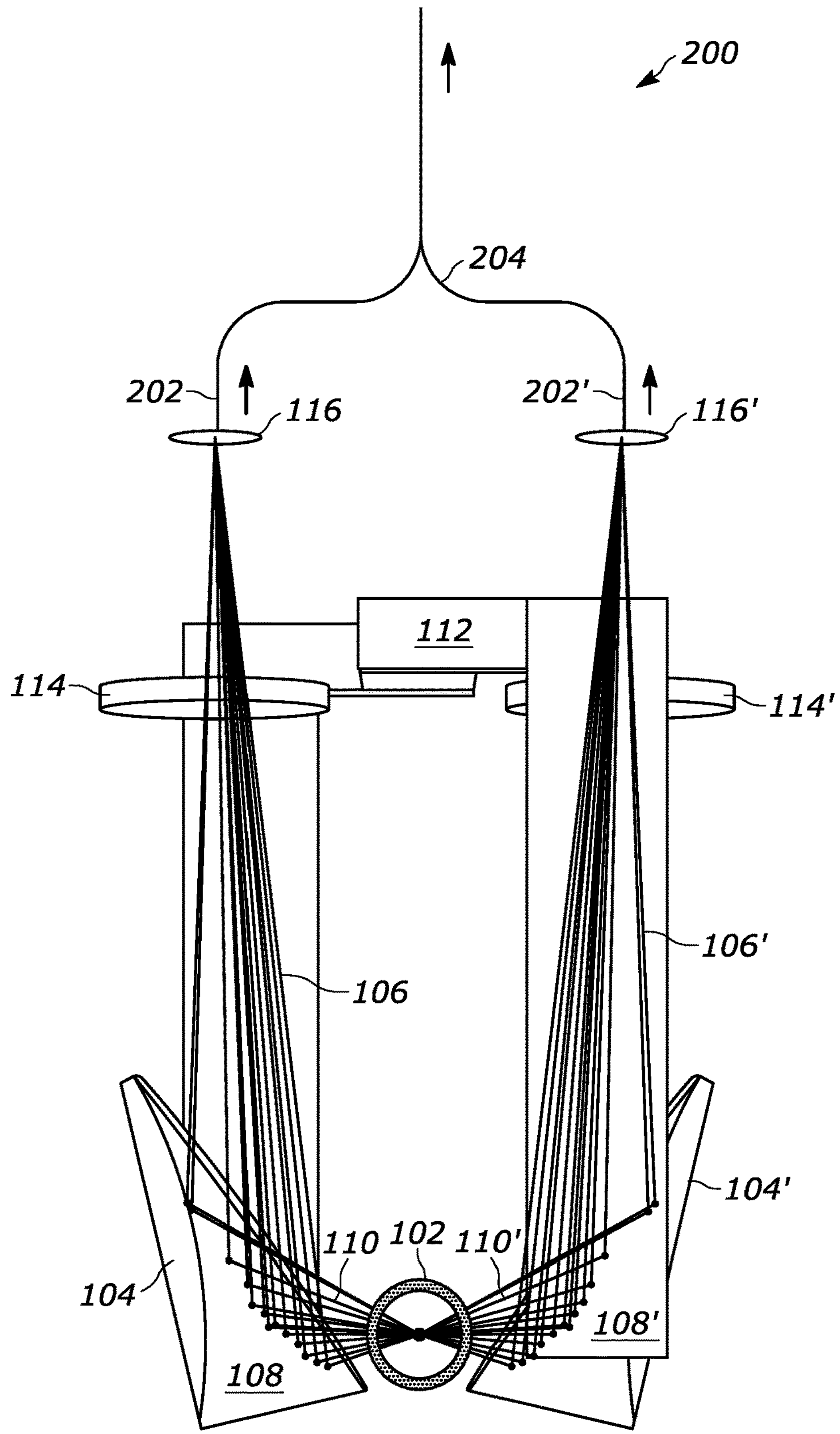
FIG. 2 illustrates a side-view of an embodiment of a dual-output light source optical system configured according to the present teaching that includes a pair of off-axis conical mirrors that couple flux from the plasma to two separate output channels that are combined into a single optical fiber channel.

Also, in various embodiments according to the present teaching, one or two optical fibers can be coupled to one or both of the first and second outputs 116, 116' so that EUV light generated by the light source system 100 is propagated in the one or two optical fibers as described more in connection with FIG. 2. Possible configurations of the outputs 116, 116' according to the present teaching can include any combination of free space and optical fibers.

Figure 1B:
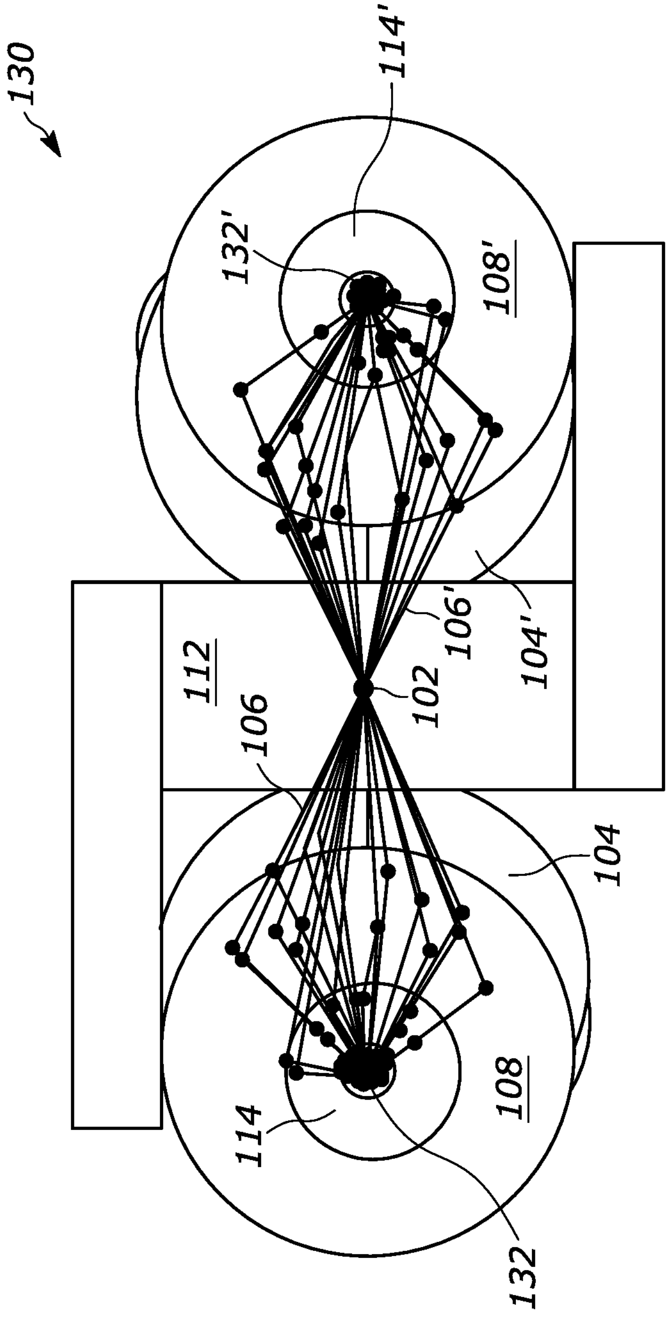
FIG. 1B illustrates a top-view of the embodiment of the dual-output light source optical system described in connection with FIG. 1A that is configured according to the present teaching to include a first and second off-axis conical mirror that couple flux from the laser-driven light source to two separate output channels.

FIG. 1B illustrates a top-view of the embodiment of the dual-output light source optical system 130 described in connection with FIG. 1A that is configured according to the present teaching to include a first and second off-axis conical mirror 104, 104' that couple flux from the laser-driven light source 102 to two separate output channels 106, 106'. As described in connection with FIG. 1A, the light source optical system 100 shows the mechanical frame 112 that support the first and second optical filters 114, 114'. The first and second off-axis conical mirror 104, 104' are positioned under the first and second optical filters 114, 114' in respective ones of the first and second optical paths 106, 106'. The reflective surfaces 108, 108' are shown directly under the first and second optical filters 114, 114'. The group of dots in the center of the first and second optical filters 114, 114' are generated from ray tracing and are positioned at respective second focal points 132, 132' of the first and second off-axis conical mirrors 104, 104'.

Figure 1C:
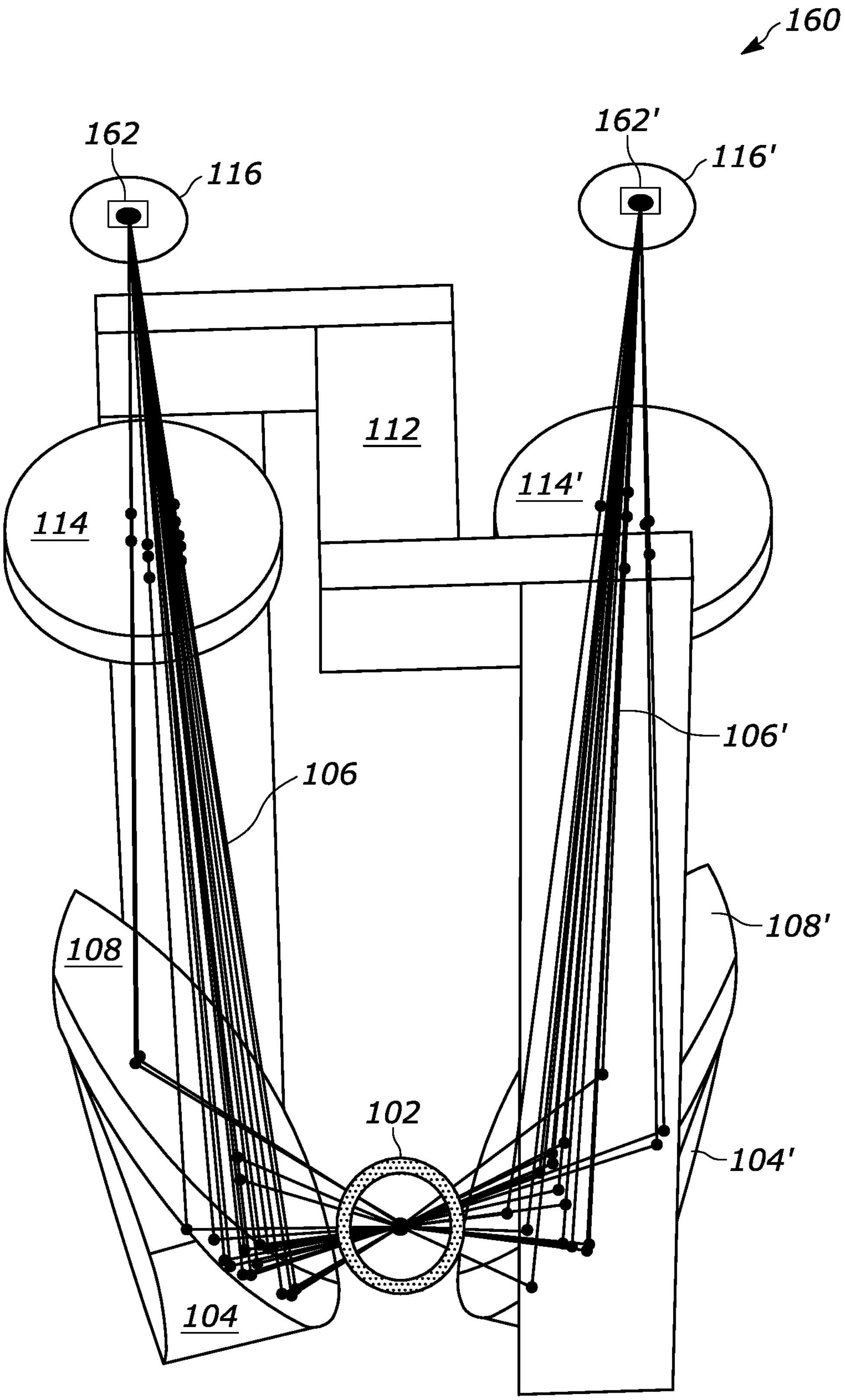
FIG. 1C illustrates a perspective-view of the embodiment of the dual-output light source optical system described in connection with FIG. 1A that is configured according to the present teaching to include a first and second off-axis conical mirror that couple flux from a laser-driven light source to two separate output channels.

FIG. 1C illustrates a perspective-view of the embodiment of the dual-output light source optical system 160 described in connection with FIG. 1A that is configured according to the present teaching to include a first and second off-axis conical mirror 104, 104' that couple flux from a laser-driven light source 102 to two separate output channels 106, 106'. The perspective-view shown in FIG. 1C is similar to the side-view that is described in detail in connection with FIG. 1A. However, the perspective-view shows more detailed ray tracing illustrating the first and second focal points of the first and second off-axis conical mirror 104, 104'.

As described in connection with FIG. 1A, the light source optical system 160 shows the mechanical frame 112 that supports the first and second optical filters 114, 114'. The laser-driven light source 102 is positioned proximate to the first and second off-axis conical mirror 104, 104' so as to couple light flux from the plasma light source 102 into the first and second optical output channel 106, 106'. The dots in the ray tracing on the first and second off-axis conical mirror 104, 104' indicate where the rays strike the first focal points of the conical mirror 104, 104' on the reflective surfaces 108, 108'. Similarly, the dots in the ray tracing on the first and second optical filters 114, 114' indicate where the rays strike the optical filters 114, 114' in transmission to the second focal points of the conical mirror 104, 104'. The outputs 116, 116' show the rays striking the second of two focal points 162, 162' formed by the conical mirror 104, 104'.

FIG. 2 illustrates a side-view of an embodiment of a high-brightness broad-band dual-output light source optical system 200 configured according to the present teaching that includes a pair of off-axis conical mirrors 104, 104' that couple flux from the plasma to two separate output channels 106, 106' that are combined into a single optical fiber channel. The dual-output broad-band light source optical system 200 is similar to the dual-output broad-band light source optical system 100 that is described in connection with FIGS. 1A-C but also includes output fiber coupling and fiber combining that combines optical beams with different spectral properties.

More specifically, the light source system 200 includes first and second off-axis conical mirrors 104, 104' that couple light flux from the plasma light source 102 into a first and a second separate optical output channel 106, 106'. At least one of the first and second off-axis conical mirrors 104, 104' can be movable. At least one of the first and second off-axis conical mirrors 104, 104' can be an off-axis ellipsoidal mirror or an off-axis-parabolic mirror. The first and second off-axis conical mirrors 104, 104' each include a reflective surface 108, 108' that is positioned proximate to respective ones of the first and second regions of emission 110, 110' that are within the at least 180-degree angular range of emission so that light generated by the thermal plasma and propagating from these regions of emission strikes respective ones of the first focal point of the first and second off-axis conical mirrors 104, 104' and is then reflected away in respective ones of the first and second optical paths 106, 106'. Like in FIG. 1A-1C, the dots show ray tracing of rays reflecting off the reflective surfaces 108, 108'.

At least one of the reflective surfaces 108, 108' on respective ones of the first and second off-axis conical mirrors 104, 104' that is positioned proximate to respective ones of the first and second regions of emission 110, 110 of the laser-driven light source 102 includes an optical coating that forms an optical filter. The filter function of one or both of these optical filters can be, for example, a bandpass filter function or a high or low pass filter function. In many embodiments of the light source of the present teaching, both the surface on the first off-axis conical mirror 104 and the surface on the second off-axis conical mirror 104' include a coating that forms an optical filter so that the first off-axis conical mirror 104 comprises a filter with a first optical bandwidth and the second off-axis conical mirror 104' comprises a filter with second optical bandwidth, where the first and second optical bandwidth are not equal.

The first optical filter 114 that passes light with a first optical spectrum is positioned in the first optical path 106. Similarly, the second optical filter 114' that passes light with a second optical spectrum is positioned in the second optical path 106'. The mechanical frame 112 supports the first and second optical filters 114, 114'.

The first and second optical outputs 116, 116' are positioned at respective ones of the second focal points of the first and second off-axis conical mirror 104, 104'. In the fiber coupled configuration shown in FIG. 2, the first optical output 116 is coupled to a first optical fiber 202 and the second optical output 116' is coupled to a second optical fiber 202'. An optical fiber combiner 204 includes a first input that is coupled to the first optical fiber 202 and a second input that that is coupled to the second optical fiber 202'.

An output of the optical fiber combiner 204 passes a combined optical beam that includes the optical spectra of optical beams in the first and second optical paths 106, 106'. The combined optical spectra include a first optical beam that has been filtered by any filters on the surface of the first off-axis conical mirrors 104 and then filtered by the first optical filters 114. Also, the combined optical spectra include a second optical beam that has been filtered by any filters on the surface of the second off-axis conical mirrors 104' and then filtered by the second optical filters 114'. In many embodiments, the filter functions of filters formed on the surface of the first and second off-axis conical mirrors 104, 104' and or filter functions of the first and second optical filters 114, 114' are different so that beams of two different optical spectra are combined in the optical combiner 204 to generate a combined optical spectrum with a more complex spectrum for a desired application.

Figure 3:
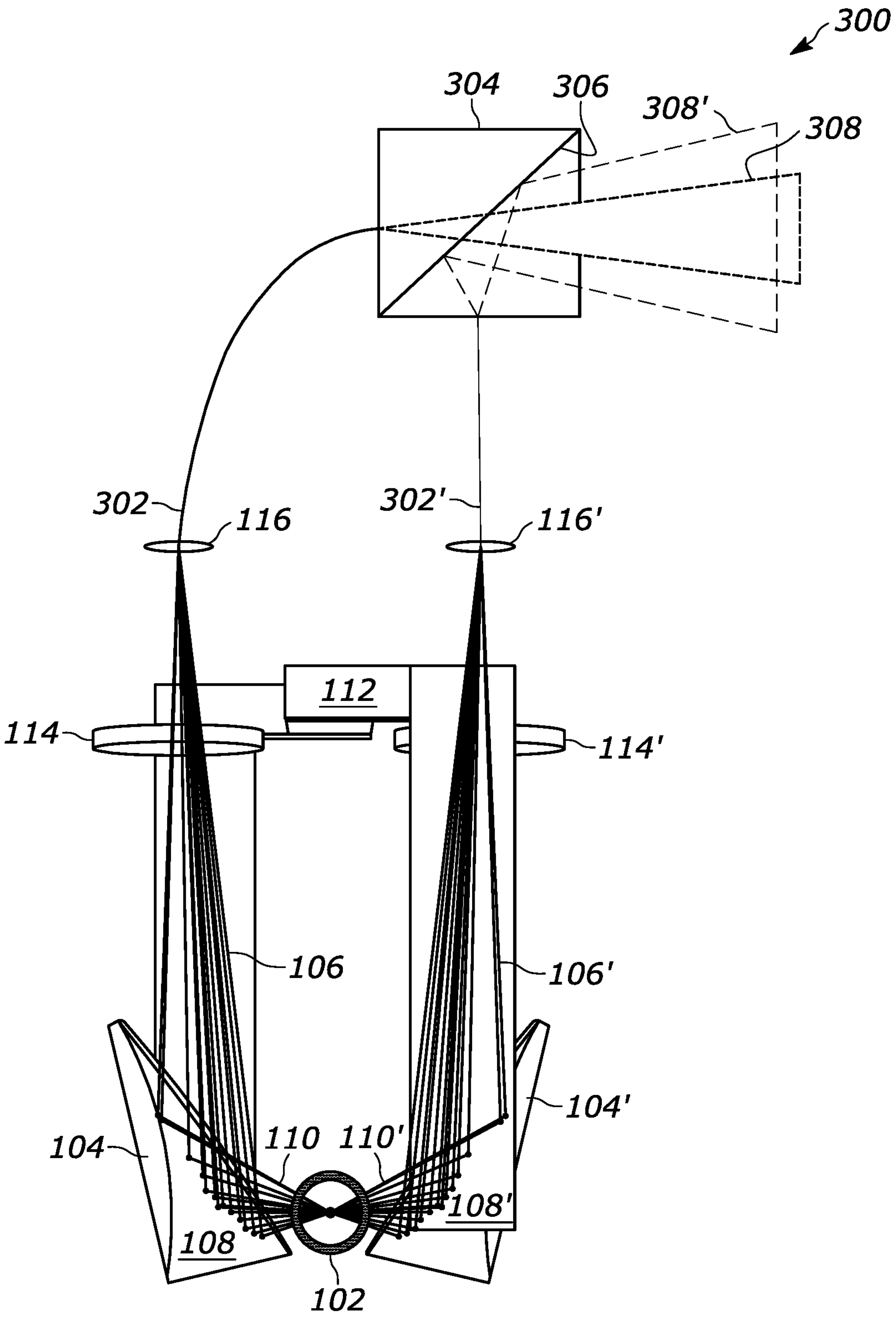
FIG. 3 illustrates a side-view of an embodiment of a dual-output light source optical system configured according to the present teaching that includes a pair of off-axis conical mirrors that couple flux from the plasma to two separate output channels that are combined into a single free space optical channel.

FIG. 3 illustrates a side-view of an embodiment of a dual-output light source optical system 300 configured according to the present teaching that includes a pair of off-axis conical mirrors 104, 104' that couple flux from the plasma to two separate output channels 106, 106' that are combined into a single free space optical channel. The dual-output broad-band light source optical system 300 is similar to the dual-output broad-band light source optical system 200 that is described in connection with FIG. 2 but includes a free space optical combiner 304 that generates a combined optical beam that can have different spectral properties. Also, different numerical apertures in the first and second outputs can pass optical beams with different beam profiles.

More specifically, the light source system 300 includes first and second off-axis conical mirrors 104, 104' that couple light flux from the plasma light source 102 into a first and a second separate optical output channel 106, 106' as described herein. Like in the previous figures, the dots show ray tracing. The first and second off-axis conical mirrors 104, 104' include respective reflective surfaces 108, 108' that are positioned proximate to respective ones of the first and second regions of emission 110, 110' of the laser-driven light source 102. The surfaces 108, 108' can include an optical coating that forms an optical filter. The filter function of these optical filters can be, for example, a bandpass filter function or a high or low pass filter function. In many embodiment of the light source of the present teaching, both the surface on the first off-axis conical mirror 104 and the surface on the second off-axis conical mirror 104' include a coating that forms an optical filter so that the first off-axis conical mirror 104 comprises a filter with a first optical bandwidth and the second off-axis conical mirror 104' comprises a filter with second optical bandwidth, where the first and second optical bandwidth are not equal.

As described in the previous figures, the first optical filter 114 that passes light with a first optical spectrum is positioned in the first optical path 106. Similarly, the second optical filter 114' that passes light with a second optical spectrum is positioned in the second optical path 106'. The mechanical frame 112 supports the first and second optical filters 114, 114'.

The first and second optical outputs 116, 116' are positioned at respective ones of the second focal points of the first and second off-axis conical mirror 104, 104'. In some embodiments, the first optical output 116 is configured with a first numerical aperture and the second optical output 116' is configured with a second numerical aperture that is different from the first numerical aperture. In the fiber coupled configuration shown in FIG. 3, the first optical output 116 is coupled to a first optical fiber 302 and the second optical output 116' is coupled to a second optical fiber 302'. The first optical fiber 302 is coupled to a first input of an optical beam combiner 304 and the second optical fiber 302' is coupled to a second input of the optical beam combiner 304. In one specific embodiment, the optical combiner 304 can comprise a dichroic mirror.

The first optical beam propagating in the first optical fiber 302 from the first output 116 configured with the first numerical aperture is combined with the second optical beam propagating in the second optical fiber 302' from the second output 116' configured with the second numerical aperture at the beam splitting interface 306 of the optical combiner 304. FIG. 3 shows a first 308 and second optical beam 308' with different beam properties that are related to the first and second numerical apertures. In many methods of operating according to the present teaching, the first and second optical beams 308, 308' having different beam profiles also have different spectral properties.

Figure 4:
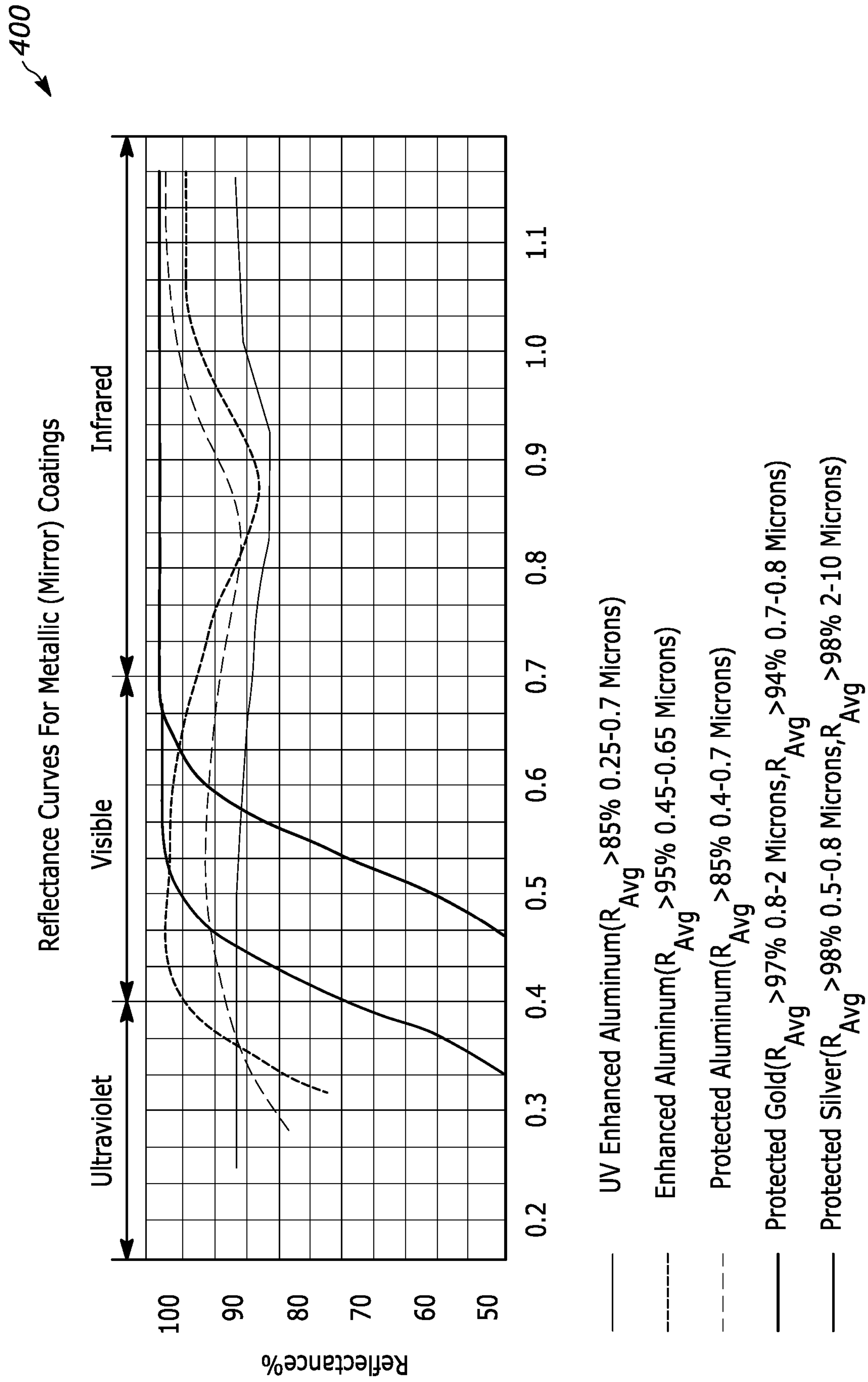
FIG. 4 illustrates data for percentage of reflectance as a function of wavelength in microns for various reflective materials that are suitable for use as a reflective surface for the first and second off-axis conical mirrors in some embodiments of the dual-output light source optical system of the present teaching.

FIG. 4 illustrates data 400 for percentage of reflectance as a function of wavelength in microns for various reflective materials that are suitable for use as a reflective surface for the first and second off-axis conical mirrors 104, 104' in some embodiments of the dual-output broad-band light source optical system of the present teaching. The use of a particular one of the various reflective material can depend, for example, upon the particular application. Percent reflectance data is presented for infrared to ultraviolet wavelengths for five metallic coatings including UV enhanced aluminum, enhanced aluminum, protected aluminum, protected gold, and protected silver. Embodiments of the dual-output broad-band light source optical system are not limited to the reflective materials described in connection with FIG. 4.

In operation, a method of generating light according to the present teaching includes producing a thermal plasma that generates light over an angular range of emission of at least 180 degrees. The light can be generated over a broad-band optical spectrum. The generated light is propagated to a first focal point of a first off-axis conical mirror where it is reflected in a first optical path. Some methods include moving the first off-axis conical mirror. In some methods, the optical filtering can be performed when reflecting in the first optical path. The light in the first optical path can be filtered to form a first output optical beam with a first optical spectrum. The first optical beam is then propagated to an optical output that is at a second focal point of the first off-axis conical mirror.

Similarly, the generated light is propagated to a first focal point of a second off-axis conical mirror where it is reflected in a second optical path. Some methods include moving the second off-axis conical mirror. The light in the second optical path is filtered to form a second output optical beam with a second optical spectrum. In some methods, the optical filtering can be performed when reflecting in the second optical path. The second optical beam is then propagated to a second optical output that is at a second focal point of the second off-axis conical mirror.

Some methods include coupling at least one of the first and second optical outputs to an optical fiber. Also, some methods include combining the first and second output optical beams into a combined optical beam that propagates in free space or in an optical fiber.

The method of the present teaching can include performing many different types of optical filtering at the first and/or second off-axis conical mirrors and/or in the first and second optical paths so as to produce light with only the desired spectral properties. For example, the optical filtering can be performed so that only ultraviolet light propagates through the first output and only visible light propagates through the second output. Also, the filtering can be performed so that only near-infrared light propagates through the first output and only ultraviolet light propagates through the second output. Also, the filtering can be performed so that only visible light propagates through the first output and only near-infrared light propagates through the second output. In one method, the filtering in the first and second optical paths is substantially the same.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A dual-output light source comprising:

a) a laser-driven light source that generates light from a thermal plasma over an angular range of emission of at least 180 degrees;

b) a first off-axis conical mirror having a surface with a first coating and being positioned proximate to the thermal plasma so that generated light propagating from a first region of the at least 180-degree angular range of emission strikes a first focal point of the first off-axis conical mirror, the first off-axis conical mirror reflecting light in a first optical path;

c) a second off-axis conical mirror having a surface with a second coating and being positioned proximate to the thermal plasma so that light generated by the laser-driven light source propagating from a second region of the at least 180-degree angular range of emission strikes a first focal point of the surface of the second off-axis conical mirror, the second off-axis conical mirror reflecting light in a second optical path;

d) a first optical filter having a first bandwidth and having an input positioned in the first optical path, wherein the light transmitting through an output of the first optical filter has a first optical spectrum;

e) a first optical output that is positioned at a second focal point of the first off-axis conical mirror in an optical path of light transmitting through the output of the first optical filter;

f) a second optical filter having a second bandwidth and having an input positioned in the second optical path, wherein light transmitting through the output of the second optical filter has a second optical spectrum;

g) a second optical output that is positioned at a second focal point of the second off-axis conical mirror in an optical path of light transmitting through the output of the second optical filter; and h) an optical combiner having a first input that is optically coupled to the first output and a second input that is optically coupled to the second output, an output of the optical combiner providing a combined output optical beam.

2. The light source of claim 1 wherein at least one of the first and second off-axis conical mirrors comprise an off-axis ellipsoidal mirror.

3. The light source of claim 1 wherein at least one of the first and second off-axis conical mirrors comprise an off-axis-parabolic mirror.

4. The light source of claim 1 wherein the laser-driven light source comprises a broad-band light source that emits ultraviolet light.

5. The light source of claim 1 wherein the laser-driven light source comprises a broad-band light source that emits visible light.

6. The light source of claim 1 wherein the laser-driven light source comprises a broad-band light source that emits near-infrared light.

7. The light source of claim 1 further comprising an optical fiber having an end optically coupled to the first optical output.

8. The light source of claim 1 further comprising a first optical fiber having an end optically coupled to the first optical output and a second optical fiber having an end optically coupled to the second optical output.

9. The light source of claim 1 wherein the first bandwidth comprises a bandwidth in the ultraviolet region of the electromagnetic spectrum and the second bandwidth comprises a bandwidth in the visible region of the electromagnetic spectrum.

10. The light source of claim 1 wherein the first bandwidth comprises a bandwidth in the ultraviolet region of the electromagnetic spectrum and the second bandwidth comprises a bandwidth in the near-infrared region of the electromagnetic spectrum.

11. The light source of claim 1 wherein the first bandwidth comprises a bandwidth in the near-infrared region of the electromagnetic spectrum and the second bandwidth comprises a bandwidth in the visible region of the electromagnetic spectrum.

12. The light source of claim 1 wherein the first and second optical filters are configured with an identical bandwidth.

13. The light source of claim 1 wherein the first optical output is configured with a first numerical aperture and the second optical output is configured with a second numerical aperture that is different from the first numerical aperture.

14. The light source of claim 1 wherein the optical combiner comprises an optical fiber combiner.

15. The light source of claim 1 wherein the optical combiner comprises a dichroic mirror.

16. The light source of claim 1 wherein the first coating comprises a first filter and the second coating comprises a second filter, wherein a filter function of the first filter is different from a filter function of the second filter.

17. The light source of claim 1 wherein the first coating comprises a first filter and the second coating comprises a second filter, wherein a bandwidth of the first filter is the same as a bandwidth of the second filter.

18. The light source of claim 1 wherein the first coating is the same as the second coating.

19. The light source of claim 1 wherein at least one of the first and the second off-axis conical mirrors include a coating comprising gold.

20. The light source of claim 1 wherein at least one of the first and the second off-axis conical mirrors include a coating comprising aluminum.

21. The light source of claim 1 wherein the first off-axis conical mirror is movable so that a perpendicular to the surface of the first off-axis conical mirror moves relative to the output aperture of the light source.

22. The light source of claim 1 wherein the first off-axis conical mirror is movable so that a perpendicular to the surface of the first off-axis conical mirror moves relative to an output aperture of the light source and the second off-axis conical mirror is movable so that a perpendicular to the surface of the second off-axis conical mirror moves relative to an output aperture of the light source.

23. A method of generating light, the method comprising:

a) producing a thermal plasma that generates light over an angular range of emission of at least 180 degrees;
b) propagating the generated light to a first mirror that reflects the generated light in a first optical path;
c) filtering light in the first optical path to form a first output optical beam with a first optical spectrum;
d) propagating the first output optical beam to a second focal point of the first mirror;
e) propagating the generated light to a second mirror that reflects the generated light in a second optical path;
f) filtering light in the second optical path to form a second output optical beam with a second optical spectrum;
g) propagating the second output optical beam to a second focal point of the second mirror; and
h) combining the first and second output optical beams.

24. The method of claim 23 wherein the propagating the generated light to the first mirror comprises propagating to a focal point of the first mirror.

25. The method of claim 23 further comprising performing optical filtering at the first mirror.

26. The method of claim 23 further comprising performing optical filtering at the first and second mirrors.

27. The method of claim 23 further comprising moving at least one of the first and second mirrors.

28. The method of claim 23 wherein the producing a thermal plasma that generates light comprises generating light with a broad-band light source.

29. The method of claim 23 further comprising coupling at least one of the first and second output optical beam to an optical fiber.

30. The method of claim 23 further comprising coupling the first output optical beam to an optical device with a first numerical aperture and coupling the second output optical beam to an optical device with a second numerical aperture that is not equal to the first numerical aperture.

31. The method of claim 23 further comprising coupling the first output optical beam to a first input of an optical beam splitter and coupling the second output optical beam to a second input of the optical beam splitter.

32. The method of claim 23 further comprising coupling the first and second output optical beams to a single optical fiber.

33. The method of claim 23 wherein the filtering light in the first optical path to form the first output optical beam with the first optical spectrum comprises filtering to transmit only ultraviolet light and the filtering light in the second optical path to form the second output optical beam with the second optical spectrum comprises filtering to transmit only visible light.

34. The method of claim 24 wherein the filtering light in the first optical path to form the first output optical beam with the first optical spectrum comprises filtering to transmit only ultraviolet light and the filtering light in the second optical path to form the second output optical beam with the second optical spectrum comprises filtering to transmit only near-infrared light.

35. The method of claim 23 wherein the filtering light in the first optical path to form the first output optical beam with the first optical spectrum comprises filtering to transmit only visible light and the filtering light in the second optical path to form the second output optical beam with the second optical spectrum comprises filtering to transmit only near-infrared light.

36. The method of claim 23 wherein the first optical spectrum and the second optical spectrum are identical optical spectrums.

37. The method of claim 23 wherein the first optical spectrum is different from the second optical spectrum.

38. A dual-output light source comprising:

a) a laser-driven light source that generates light from a thermal plasma over an angular range of emission of at least 180 degrees;
b) a first off-axis conical mirror having a surface with a first coating and being positioned proximate to the thermal plasma so that generated light propagating from a first region of the at least 180-degree angular range of emission strikes a first focal point of the first off-axis conical mirror, the first off-axis conical mirror reflecting light in a first optical path;
c) a second off-axis conical mirror having a surface with a second coating and being positioned proximate to the thermal plasma so that light generated by the laser-driven light source propagating from a second region of the at least 180-degree angular range of emission strikes a first focal point of the surface of the second off-axis conical mirror, the second off-axis conical mirror reflecting light in a second optical path;

d) a first optical filter having a first bandwidth and having an input positioned in the first optical path, wherein the light transmitting through an output of the first optical filter has a first optical spectrum;

e) a first optical output that is positioned at a second focal point of the first off-axis conical mirror in an optical path of light transmitting through the output of the first optical filter;

f) a second optical filter having a second bandwidth and having an input positioned in the second optical path, wherein light transmitting through the output of the second optical filter has a second optical spectrum; and g) a second optical output that is positioned at a second focal point of the second off-axis conical mirror in an optical path of light transmitting through the output of the second optical filter, wherein at least one of the first optical coating and the second optical coating comprise an optical filter.

39. The dual-output light source of claim 38 wherein a filter function of the optical filter of at least one of the first optical coating and the second optical coating comprises a bandpass filter function.

40. The dual-output light source of claim 38 wherein a filter function of the optical filter of at least one of the first optical coating and the second optical coating comprises a high pass filter function.

41. The dual-output light source of claim 38 wherein a filter function of the optical filter of at least one of the first optical coating and the second optical coating comprises a low pass filter function.

42. The dual-output light source of claim 38 wherein the first optical coating comprises a first optical filter and the second optical coating comprises a second optical filter.

43. The dual-output light source of claim 42 wherein a bandwidth of the first optical filter is not equal to a bandwidth of the second optical filter.

44. The dual-output light source of claim 38 wherein the first optical coating is the same as the second optical coating.

* * * * *